United States Patent
Rochford et al.

(10) Patent No.: US 11,067,784 B2
(45) Date of Patent: *Jul. 20, 2021

(54) SYSTEM AND TECHNIQUES FOR DETECTING FLUORESCING PARTICLES ON A TARGET

(71) Applicant: BAE Systems Information and Electronic Systems Integration Inc., Nashua, NH (US)

(72) Inventors: Richard Rochford, Litchfield, NH (US); Tristan J. Baldwin, New Boston, NH (US); Edward L. Brabant, Jr., Dracut, MA (US); Charles H. Mazel, Bedford, MA (US); Michael J. Meade, Nashua, NH (US); Matteo Forgione, Lowell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/583,244

(22) Filed: Sep. 25, 2019

(65) Prior Publication Data
US 2020/0018942 A1 Jan. 16, 2020

Related U.S. Application Data

(63) Continuation-in-part of application No. 15/583,480, filed on May 1, 2017, now Pat. No. 10,466,176.

(51) Int. Cl.
*G02B 21/16* (2006.01)
*G03B 21/20* (2006.01)
(Continued)

(52) U.S. Cl.
CPC .......... *G02B 21/16* (2013.01); *G02B 21/361* (2013.01); *G03B 21/204* (2013.01); *G02B 21/28* (2013.01)

(58) Field of Classification Search
CPC ...... G02B 21/16; G02B 21/361; G02B 21/28; G03B 21/204
See application file for complete search history.

(56) References Cited

U.S. PATENT DOCUMENTS 4,761,719 A * 8/1988 Yamada .................... F21S 8/00
362/135
5,354,323 A * 10/1994 Whitebook ............ A61B 18/20
606/11

(Continued)

OTHER PUBLICATIONS

Screen capture from YouTube video clip entitled "Forgione UMFD Teaser 081219", 1 page, uploaded on Aug. 11, 2019, by user Matteo Forgione. Retrieved from Internet: <https://youtu.be/V5xxZNcgjVA>.

(Continued)

*Primary Examiner* — Jamil Ahmed
(74) *Attorney, Agent, or Firm* — Scott J. Asmus; Sand, Sebolt & Wernow, LPA

(57) ABSTRACT

The present disclosure relates to a system and technique for a system for detecting fluorescing particles on a target comprising a viewing device configured to view the target and a light subsystem configured to illuminate the target, wherein the target includes a fluorescing particle that effectuates the fluorescent feedback second wavelength. In one example, no additional fluorescing agent or additive, other than the fluorescing particle, is added to the target. A passive cooling subsystem is configured to prevent overheating of the system without expending additional energy resources. The system includes a filter in operative communication with the viewing device having a selected filter wavelength configured to allow light to pass that is greater than the first (Continued)

wavelength and at least one non-transitory computer readable storage medium having instructions encoded thereon.

19 Claims, 19 Drawing Sheets

(51) Int. Cl.
*G02B 21/36* (2006.01)
*G02B 21/28* (2006.01)

(56) References Cited

U.S. PATENT DOCUMENTS

| | | | | |
|---|---|---|---|---|
| 6,005,964 | A | * 12/1999 | Reid | G01N 15/1475 378/42 |
| 6,377,345 | B1 | * 4/2002 | Powell | G08B 17/107 250/574 |
| 9,042,967 | B2 | * 5/2015 | Dacosta | A61B 5/0071 600/476 |
| 2006/0008866 | A1 | * 1/2006 | Flick | G01N 21/6486 435/34 |
| 2008/0027665 | A1 | 1/2008 | Takahashi et al. | |
| 2010/0110676 | A1 | * 5/2010 | Falicoff | F21V 5/04 362/235 |
| 2011/0205703 | A1 | * 8/2011 | Weaver | G03B 17/55 361/695 |
| 2013/0090538 | A1 | * 4/2013 | Garfield | A61B 5/435 600/317 |
| 2014/0152801 | A1 | 6/2014 | Fine et al. | |
| 2016/0350909 | A1 | * 12/2016 | Chu | G06T 7/0006 |

OTHER PUBLICATIONS

Tristan Baldwin, Visual Identification of Organic Residue on Microelectronic Components via In-Process Visible Light Fluorescence, IMAPS New England Symposium and Expo, May 2017, 1 page, United States.

Tristan Baldwin, Blue Light (460nm) Fluorescence for the Detection of Organic Contamination in Microelectronic Assemblies, IMAPS New England Symposium and Expo, May 2017, 25 pages, United States.

Nightsea, Stereo Microscope Fluorescence Adapter, Published Jan. 19, 2014, retrieved from https://www.nightsea.com/products/stereomicroscope-fluorescence-adapter/ on Aug. 8, 2018, United Stated.

Keyence, VHX-6000 Digital Microscope, retrieved from https://www.keyence.com/ss/products/microscope/vhx-6000/, Aug. 8, 2018, United States.

Sita Process Solutions, FluoScan 3D, retrieved from https://www.sita-process.com/products/fluorescence-measuring-and-testing-devices/sita-fluoscan-3d/, Aug. 15, 2018, United States.

Nightsea, Light Head Hanger System for the Stereo Microscope Fluorescence Adapter, Published Jan. 19, 2014, retrieved from https://www.nightsea.com/products/sfa-light-head-hanger/ on Aug. 15, 2018, United Stated.

International Search Report, PCT/US2018/030134, dated Jul. 9, 2018, 15 pages.

* cited by examiner

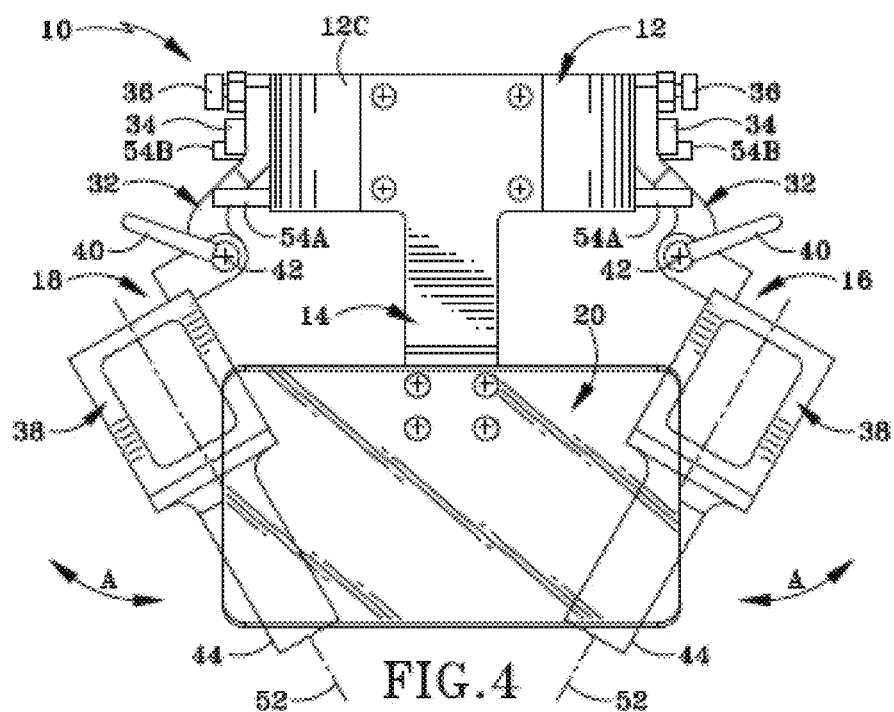
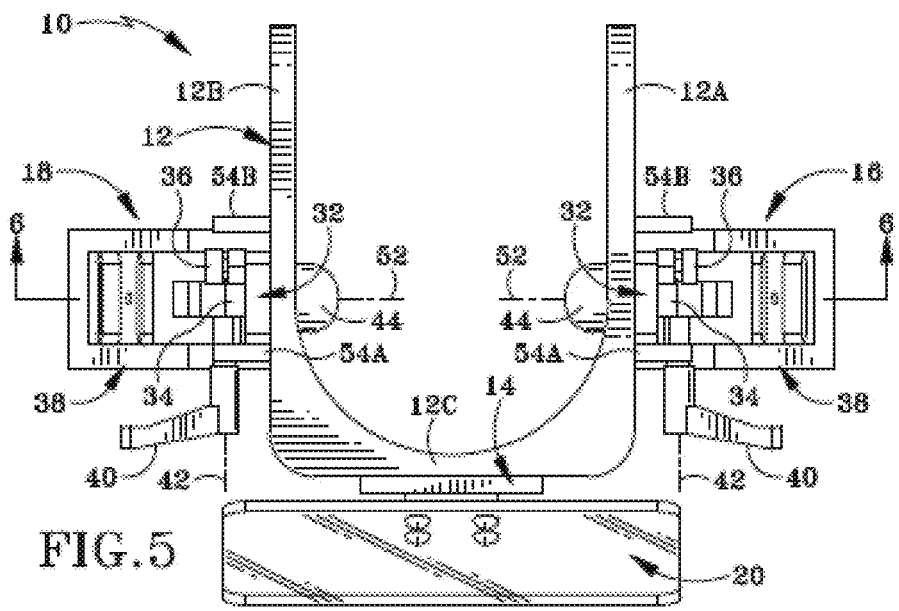

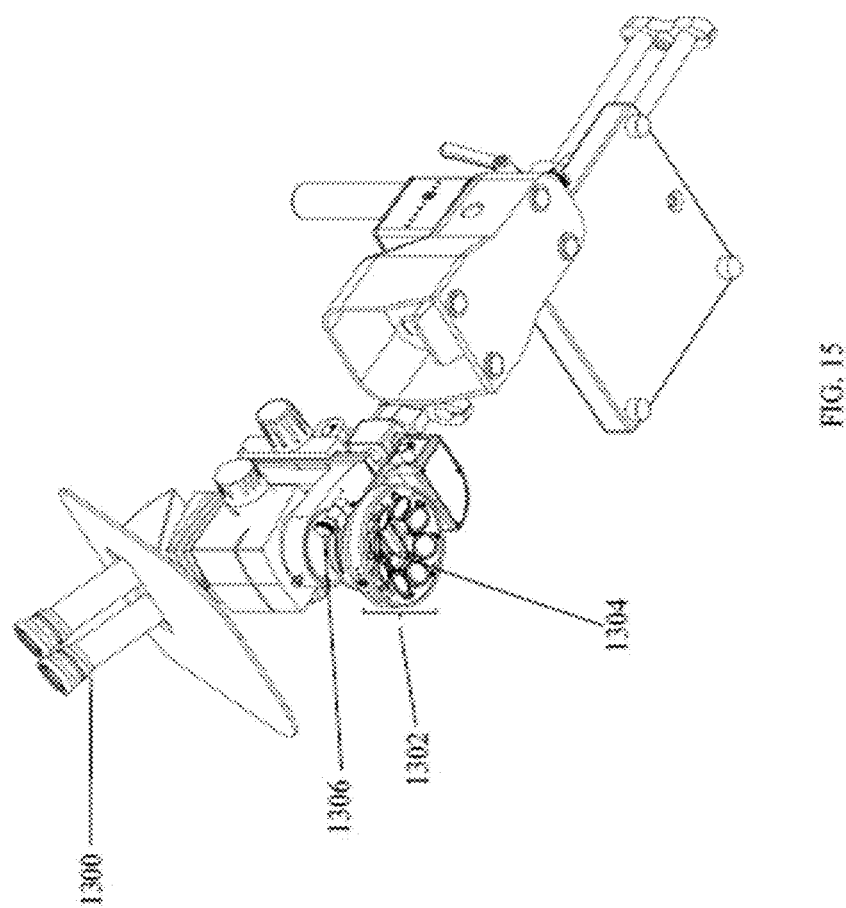

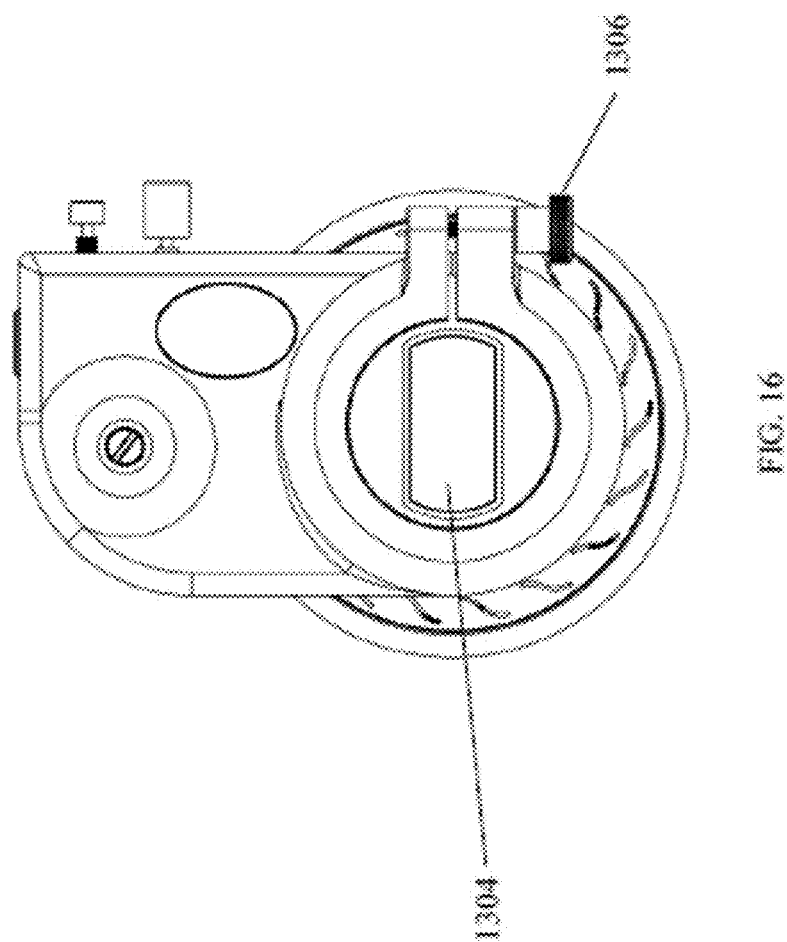

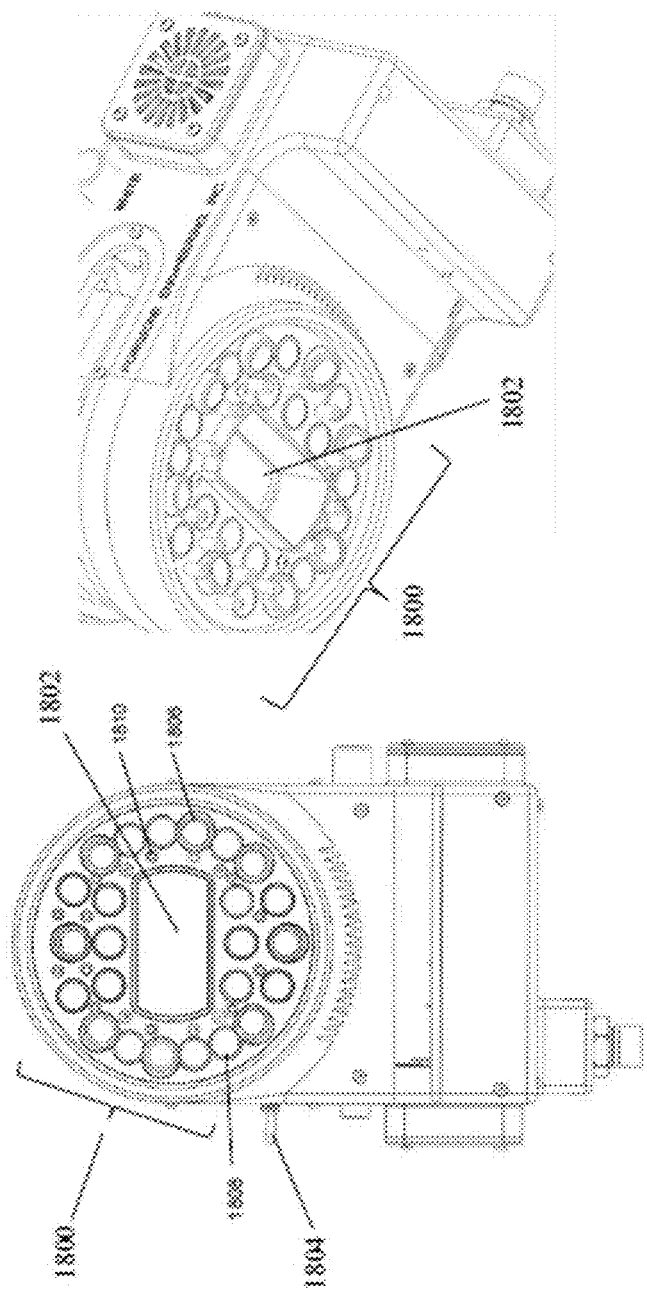

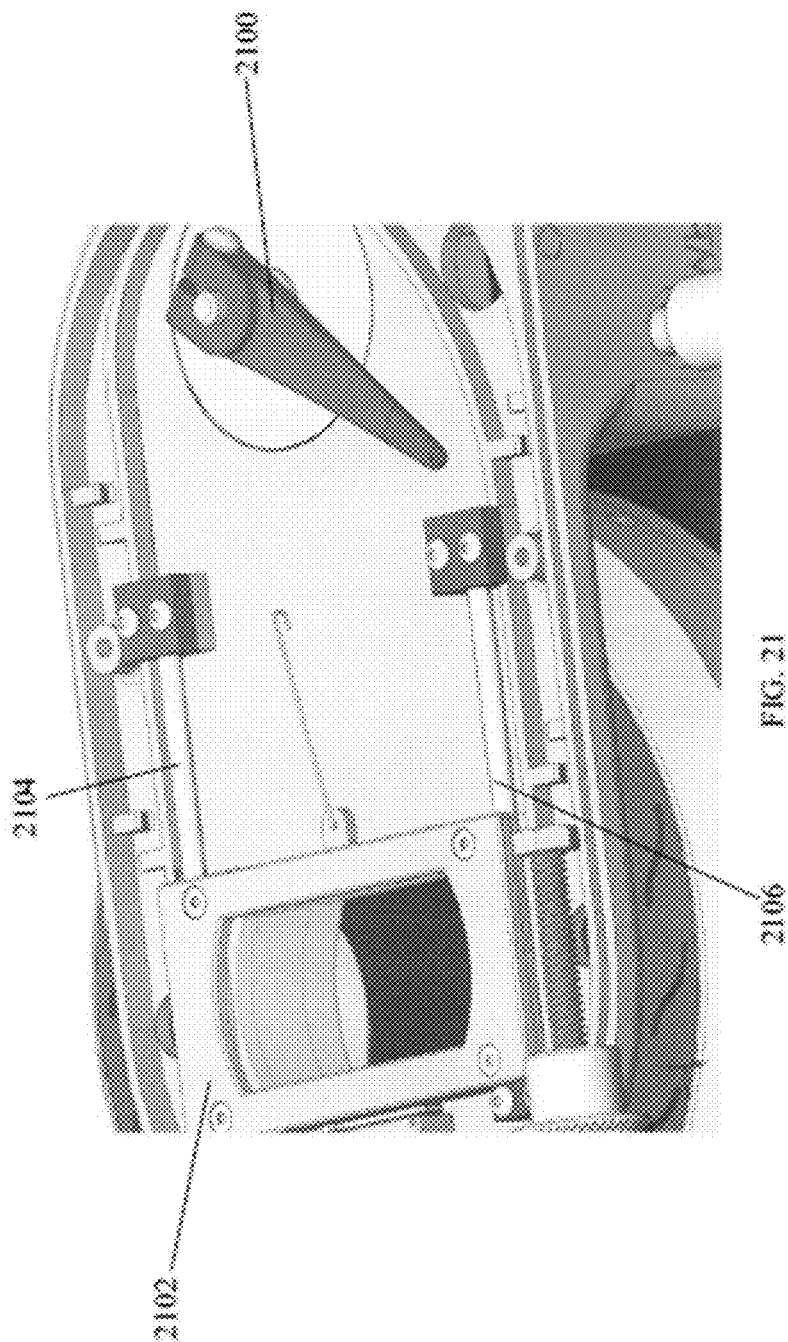

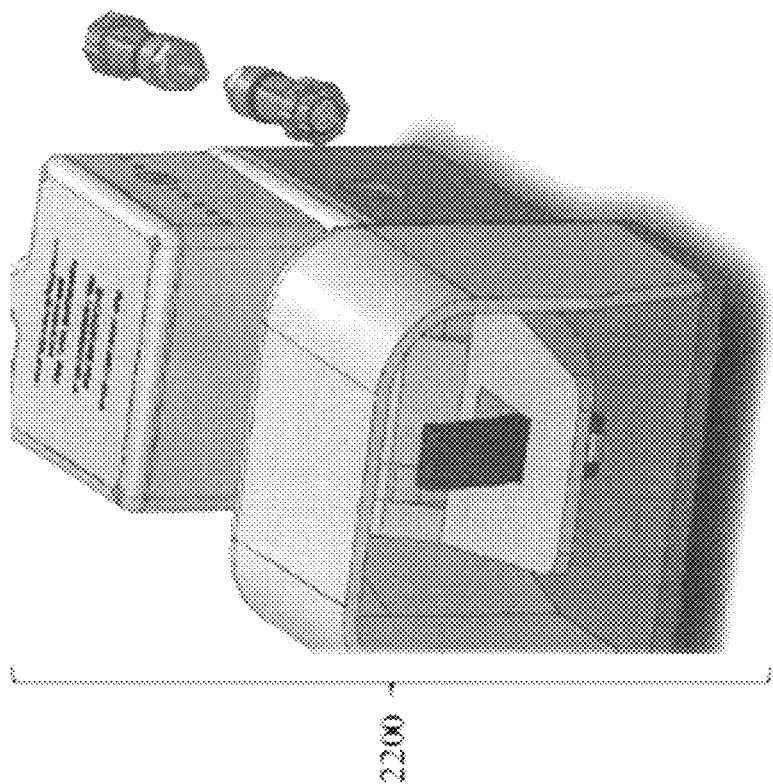

SYSTEM AND TECHNIQUES FOR DETECTING FLUORESCING PARTICLES ON A TARGET

CROSS REFERENCE TO RELATED APPLICATIONS

This application claims priority as a Continuation-In-Part to U.S. patent application Ser. No. 15/583,480, filed May 1, 2017, the content of which is incorporated by reference herein its entirety.

BACKGROUND

Technical Field

The present disclosure relates generally to a system and technique for detecting fluorescing particles on a target. More particularly, in one example the present disclosure relates to a system and method for detecting fluorescing particles utilizing light in a first wavelength range that generates fluorescent feedback from the fluorescing particles on the target in a second wavelength range. In another example, the present disclosure relates to the use of blue light to generate a fluorescent feedback from a fluorescing particles coupled with a filter in a microscope or other viewing device that filters out the background blue light so as to only reveal the fluorescent feedback in the microscope or other viewing device.

Background Information

The inspection and analysis field allows for the examination of electronics, chemicals, materials and biological samples. Such analysis is critical in ensuring quality control, fault diagnosis and fundamental research. The systems and techniques for certain examination requires microscopes in order to accurately detect items such as microelectronics.

Microelectronic circuits or integrated circuits are small electrical devices configured to carry electrical current in the transmission of signals between electrical devices. The transmission of signals moving along the microelectronic circuits or integrated circuits is most efficient when the physical wiring is free from contaminants or other particles or residue that hinder the conduction of electricity through the wires. Some exemplary contaminants are the epoxy resins used to adhere the wires to the substrate of the microelectronic circuit. Furthermore, some of the epoxy resins used to bond the wires to the substrate are organically based.

Detection of organic epoxy residues contaminated on gold wires or gold ribbon bonded to the surface of the microelectronic circuit board using a white light microscopic device is difficult. Thin, electrically insulating resin layers (contamination) are often not easily detectable or invisible to persons using a white light microscope. While fluorescence is commonly used to observe conformal coatings, such visual techniques have previously proven ineffective for the detection of organic epoxy resins and phenolic ester resins in microelectronic hardware. When these resins contaminate a circuit/chip or a wire assembly, it is difficult to detect the resins using low cost in-process techniques. However, detection of these contaminants on wiring or ribbon bondings would yield improvements in circuit reliability and efficiency.

The concept of utilizing fluorescent response typically utilizes ultraviolet (UV) light in order to illicit a fluorescent response from the particle that has been excited from the incoming light. Typically, it is important to get a high degree of fluorescent efficiency. An observable fluorescent response can be accomplished by exciting a particle with a low excitation power then viewing the fluorescent response in a high power microscope. Alternatively, it is possible to excite a particle with a highly powerful excitation wavelength and view the fluorescent response with a simple viewing device or the human eye. In each scenario, a photon of the excitation wavelength hits a molecule on the particle and an electron from the particle is promoted to an excited higher level of energy. Then, when the excited particle drops down from the excited state to an unexcited state, there is a longer wavelength light that is produced. Thus, for example, if an initial excitation wavelength in the UV band is approximately 100 nm, then the resultant fluorescent feedback band would be greater than 100 nm and could be about 200 nm. Therefore, there is a need for a new apparatus or system to detect fluorescing particles on a target of interest such as a microelectronic circuit board, which is nonhazardous to an operator and can be cost efficient.

SUMMARY

In one example, a fluorescence viewing capability can be integrated into an existing bench top stereoscope so that the stereoscope does not require expensive or destructive analytical techniques such as IR spectroscopy or X-ray photoelectron spectroscopy (XPS). Similarly, this apparatus or system may be adapted for use on modules of any size. Unlike UV fluorescence techniques, no hazardous wavelengths of light are used.

An example embodiment of the present disclosure provides a system for detecting contaminants on a target including a viewing device configured to view the target; a light subsystem configured to illuminate the electronic circuit, wherein the light subsystem comprises a first light source emitting light at a first wavelength towards the electronic circuit adapted to excite particles on the electronic circuit at a fluorescent feedback second wavelength generated in response to particle excitation from the first light source, wherein the fluorescent feedback second wavelength is greater than the first wavelength, and the first light source is a blue light source; wherein the target includes a fluorescing particle that effectuates the fluorescent feedback second wavelength, and no additional fluorescing agent or additive, other than the fluorescing particle, is added to the target; a passive cooling subsystem configured to prevent overheating of the system without expending additional energy resources; a filter in operative communication with the viewing device having a selected filter wavelength configured to allow light to pass that is greater than the first wavelength; and at least one non-transitory computer readable storage medium having instructions encoded thereon that, when executed by one or more processors, result in the following operations for detecting the fluorescing particle on the target, the operations configured to: emit light from the blue light source at the first wavelength toward the target; effect the excitation of particles on the target with the blue light, wherein the particles generate a fluorescent feedback second wavelength in response to the excitation and the fluorescent feedback second wavelength is greater than the first wavelength; view the fluorescent feedback second wavelength with the viewing device; and determine whether the fluorescing particle is present on the target based on the fluorescent feedback second wavelength.

Particular implementations may include one or more of the following features. The passive cooling subsystem may comprise a plurality of heat sinks. The passive cooling subsystem may comprise a plurality of vents. The system of the present disclosure may further comprise a switch operatively connected to a light subsystem and shutter module, thereby allowing the light subsystem and shutter module to turn on and off.

Another example embodiment provides a system for detecting contaminants on an electronic circuit including a viewing device adapted to view the electronic circuit having an electrically conductive element bonded to a substrate; a light subsystem configured to illuminate the electronic circuit, wherein the light subsystem includes a first light source emitting light at a first wavelength towards the electronic circuit adapted to excite particles on the electronic circuit at a fluorescent feedback second wavelength generated in response to particle excitation from the first light source, wherein the fluorescent feedback second wavelength is greater than the first wavelength, and the first light source is a blue light source; a shutter module operatively engaged with the light subsystem, wherein the shutter module includes at least one filter in operative communication with the viewing device having a selected filter wavelength configured to allow light to pass that is greater than the first wavelength; a passive cooling subsystem configured to prevent overheating of the system without expending additional energy resources; a removable connection between the at least one filter and the viewing device so as to allow other filters having different selected filter wavelengths to be utilized in conjunction with the viewing device; wherein at least some of the excited particles generated in response to particle excitation from the first light source are the contaminants on the electronic circuit; wherein the contaminants comprise a phenolic ester on the electronic circuit in regions of the circuit other than where the electrically conductive element is bonded to the substrate; and wherein the phenolic ester includes an organic component that effectuates the fluorescent feedback second wavelength, and no additional fluorescing agent or additive, other than the organic component, is in the phenolic ester.

Particular implementations may include one or more of the following features. The light subsystem may include control circuitry for the light sources, thereby allowing dimming of the light sources in light subsystem. The dimming can be at preset settings such as high, medium and low or variable. In another example the control circuity that can turn on all or a fewer number of the LEDs for each light source. Light source settings in one example such as high, medium and low can be used to turn 100% of the LEDs, 75% of the LEDs or 50% of the LEDs respectively. The system may further include a clamping module that allows the light subsystem, shutter module, and passive cooling subsystem to collectively attach as a unit in a removable manner to the viewing device. The selective filter wavelength may be greater than the first wavelength and less than the fluorescent feedback second wavelength; and wherein the first wavelength is in a range from about 400 nm to about 500 nm. The first wavelength of the blue light source may be in a range from about 450 nm to about 475 nm; and wherein the fluorescent feedback second wavelength may be greater than 500 nm. The fluorescent feedback second wavelength may be generated from excitation of the phenolic ester contaminating the electrically conductive element, wherein the fluorescent feedback second wavelength may be greater than 500 nm. The passive cooling subsystem may include a plurality of heat sinks. The passive cooling subsystem may include a plurality of vents. The system of the present disclosure may further include at least one non-transitory computer readable storage medium having instructions encoded thereon that, when executed by one or more processors, result in the following operations for detecting the contaminants on the electronic circuit board, the operations configured to: emit light from the blue light source at the first wavelength toward the electronic circuit board; effect the excitation of particles on the electronic circuit board with the blue light source, wherein the particles generate a fluorescent feedback second wavelength in response to the excitation and the second wavelength is greater than the first wavelength; view the fluorescent feedback second wavelength with the viewing device; and determine whether the contaminants are present on the electronic circuit board based on the fluorescent feedback second wavelength. The system may further include a white light source for the viewing device. The system may further include a detector to detect emission intensity of the fluorescent feedback second wavelength, wherein the emission intensity is used to determine a thickness or concentration of the contaminants The system may further include a switch operatively connected to the light subsystem and shutter module, thereby allowing the light subsystem and shutter module to turn on and off.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

A sample embodiment of the present disclosure is set forth in the following description, is shown in the drawings and is particularly and distinctly pointed out and set forth in the appended claims.

FIG. 4 is a front elevation view of the light source holding apparatus according to one example.

FIG. 5 is a top plan view of the light source holding apparatus according to one example.

FIG. 15 is a perspective view of the system of the present disclosure according to one example.

FIG. 16 is a top view of the unit housing the light subsystem, passive cooling subsystem, and the shutter module according to one example.

FIGS. 18A-18B are schematic views of the unit housing the light subsystem, passive cooling subsystem, and the shutter module according to one example.

FIG. 21 is a perspective view of the unit, particularly the shutter module and its movement mechanism according to one example.

FIGS. 22A-22C are various perspective views of the foot pedal implementation of the switch according to one example.

Similar numbers refer to similar parts throughout the drawings.

DETAILED DESCRIPTION

The present disclosure relates to an apparatus for holding a light source coupled with a viewing device to detect a contaminant on a microelectronic circuit board.

Figure 1:
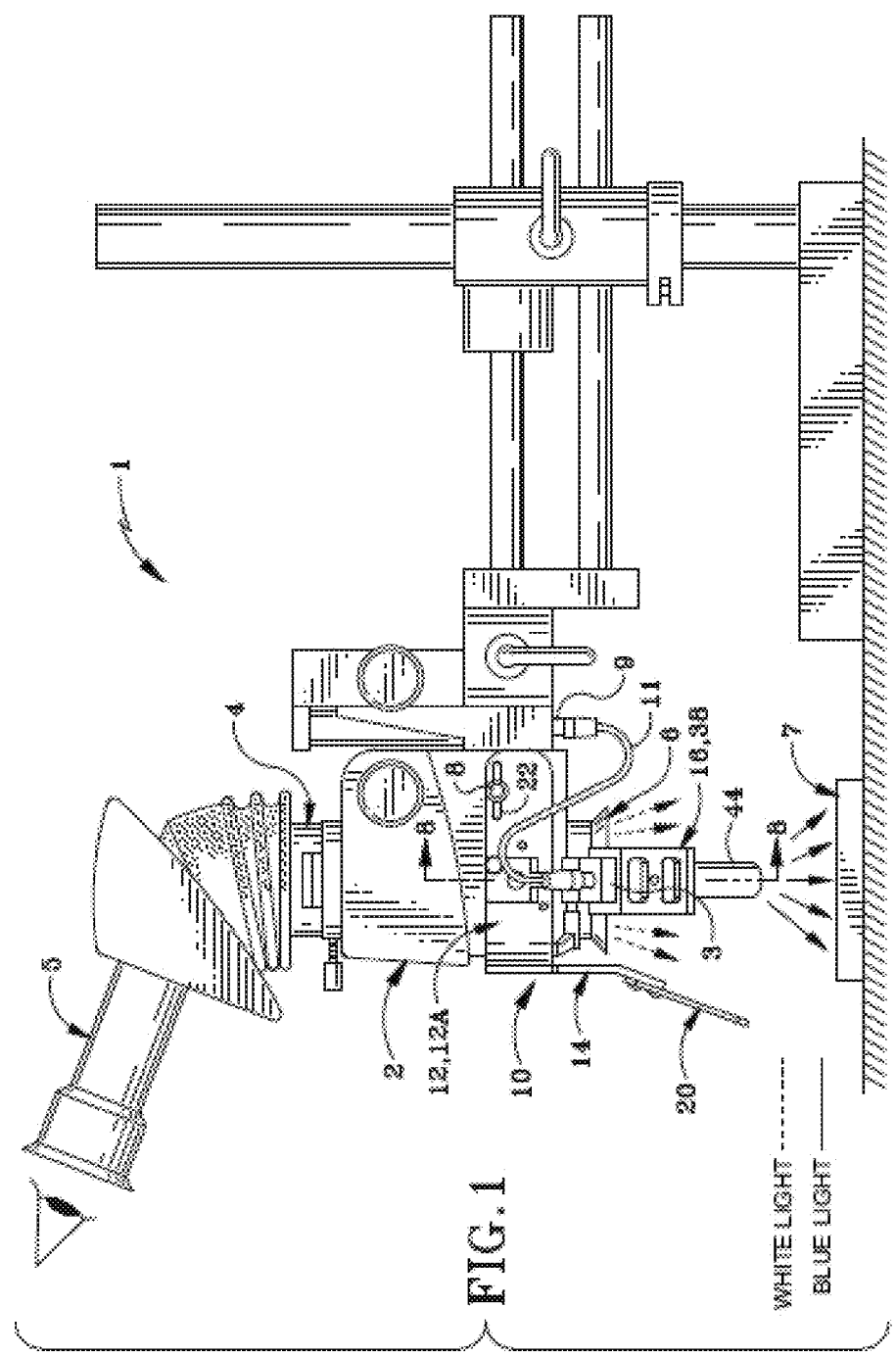
FIG. 1 is a side elevation view of a light source holding apparatus, a stereo microscope equipped with a filter, and a sample target according to one example.
Figure 2:
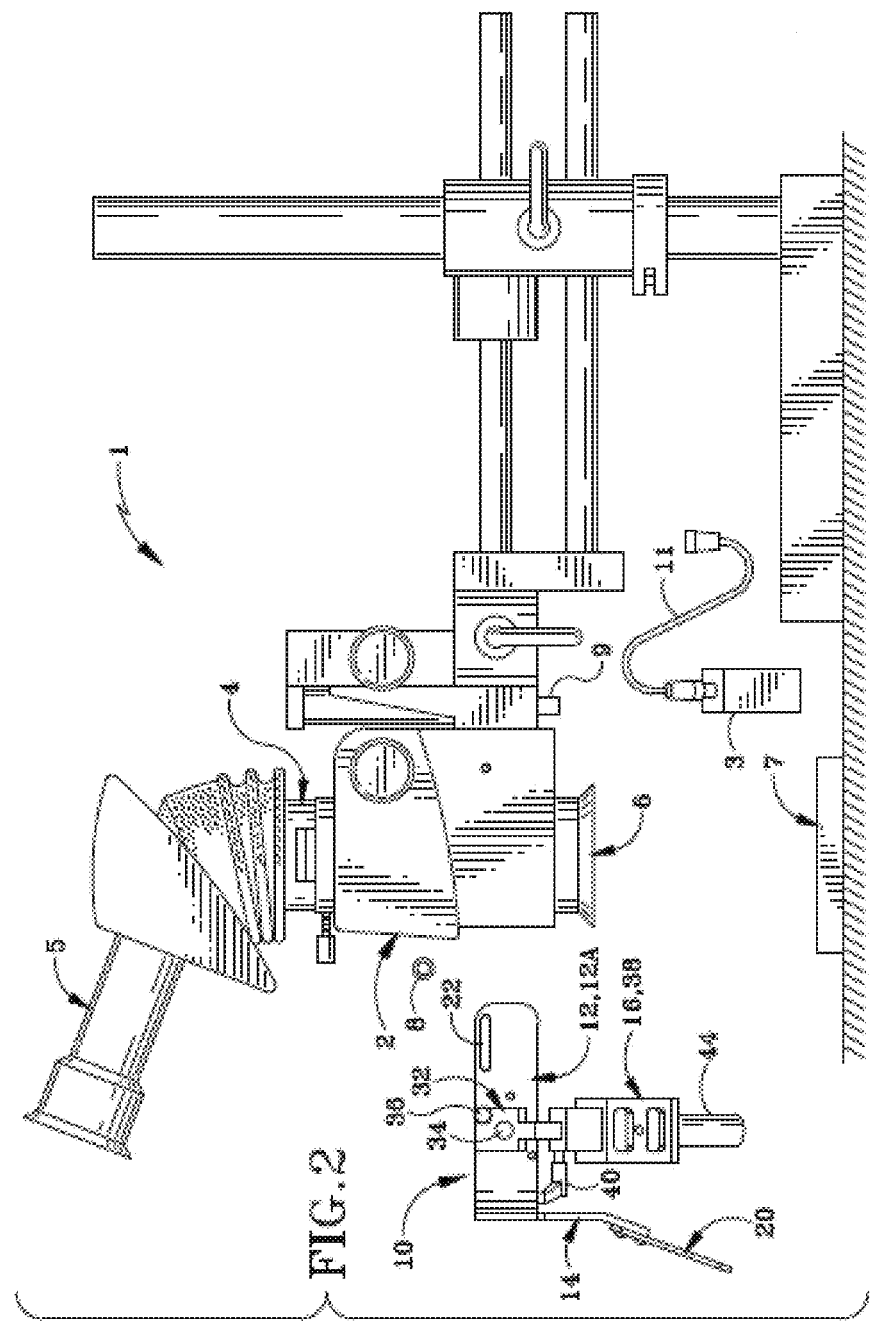
FIG. 2 is a partially exploded side elevation view of the light source holding apparatus, the stereo microscope equipped with the filter, and the sample target according to one example.

FIG. 1 and FIG. 2 depict a detection system 1 in one embodiment comprising a stereo microscope or other viewing device 2 equipped with a light source holding apparatus 10 and at least one blue light source 3 which in one example has a wavelength in a range from about 400 nanometers (nm) to about 500 nm. The system 1 includes a filter 4 which is installed in a removably connected manner with the viewing device 2 between an eyepiece 5 and a white light source 6. The filter 4 is used to filter out any light which has a wavelength beyond a selected wavelength. In one example, the term "beyond" refers to filtering wavelengths shorter than the selected wavelength. A target 7 such as a microelectronic circuit board or biological sample is placed under the blue light source 3 and white light source 6 of the microscope 2. As depicted in FIG. 2, the light source holding apparatus 10 is attached to a body of the stereo microscope by a set of screws 8. One end of a flexible cable 11 is connected with the blue light source 3 and the other end of the flexible cable 11 is connected to a power port 9 on the viewing device 2.

In one example, the viewing device 2 is a modular routine stereo microscope. One exemplary modular routine stereo microscope is manufactured by Leica Microsystems, Inc. of Buffalo Grove, Ill., model no. "M80". However, the viewing device 2 may be any type of optical viewing device or optical inspection device. The viewing device may be other microscopes besides stereo microscopes as well as goggles or glasses. Additionally, the viewing device in one example is a camera configured to allow for automation of the system of the present disclosure by capturing images and having image processing to analyze the fluorescing particles.

As depicted in FIG. 3-FIG. 8, the light source holding apparatus 10 comprises a U-shaped main body 12, a bracket 14, a first holding member 16, a second holding member 18, and a shield 20.

The U-shaped main body 12 is a substantially rigid member configured to connect with the viewing device or stereo microscope 2. The bracket 14 extends from a rigid connection with the main body 12. The shield 20 is connected at an opposite end of the bracket 14 from the main body 12. The U-shaped main body 12 further includes two legs, wherein the first holding member 16 is connected with the first leg and the second holding member 18 is connected with the second leg. The second holding member 18 is substantially identical in a mirrored structure and function to the first holding member 16, but is simply located on an opposing side of the main body 12.

In one exemplary embodiment, the shield 20 is an ambient light shield that is yellow in color to block the ambient light around the microscope. While shield 20 blocks ambient light, another exemplary feature of shield 20 and its yellow pigment is a blocking filter with properties similar (but not necessarily identical) to the filter 4 installed within the microscope. The shield 20 blocks the blue light, which is beneficial because of the harmful nature of blue light exposure. This enables the operator to look through the shield and see the fluorescence of the circuit. In another embodiment, two or more shields can be attached with the light source holding apparatus 10 to block more ambient light around the microscope.

Figure 7:
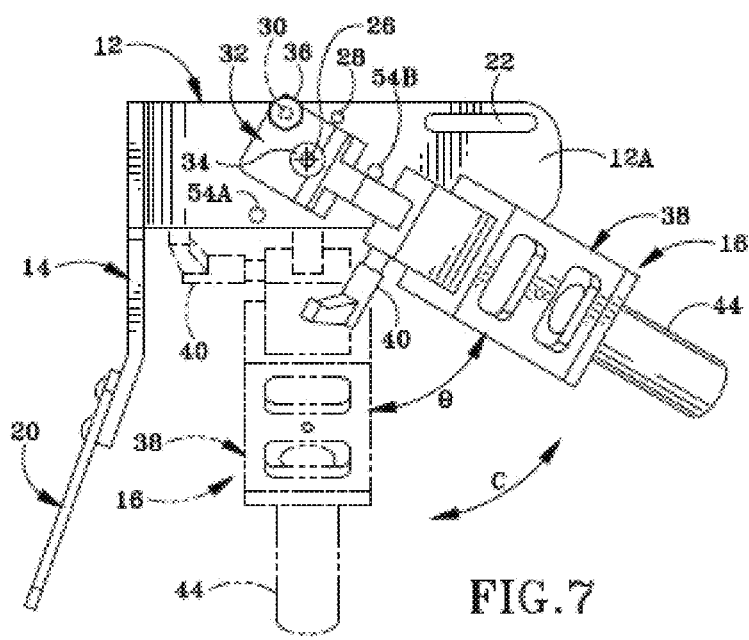
FIG. 7 is an operational side elevation view of the light source holding apparatus depicting a holding member moving from a lowered first position to a raised second position according to one example.

U-shaped main body 12 includes a first leg 12A, a second leg 12B, and a central leg 12C extending between first leg 12A and second leg 12B. First leg 12A and second leg 12B extend longitudinally in the same direction substantially parallel relative to each other from rigid connections with the central leg 12C which is arranged generally transverse relative to the first leg 12A and the second leg 12B. The first leg 12A and the second leg 12B each define a transversely aligned slot 22 which is configured to receive screw 8 therethrough for attaching the U-shaped main body 12 to the viewing device 2. The first leg 12A and the second leg 12B each define a first aperture 24 defining a transverse axis 26 therethrough about which the first holding member 16 and the second holding member 18 can respectively pivot. The first holding member 16 and the second holding member 18 pivot in a longitudinal plane about transverse axis 26. The first leg 12A and the second leg 12B further define a first hole 28 and a second hole 30. As will be described in greater detail below, the first hole 28 and the second hole 30 are used to secure each respective holding member 16, 18 between a lowered first position (FIG. 3) and a raised second position (FIG. 7).

Figure 3:
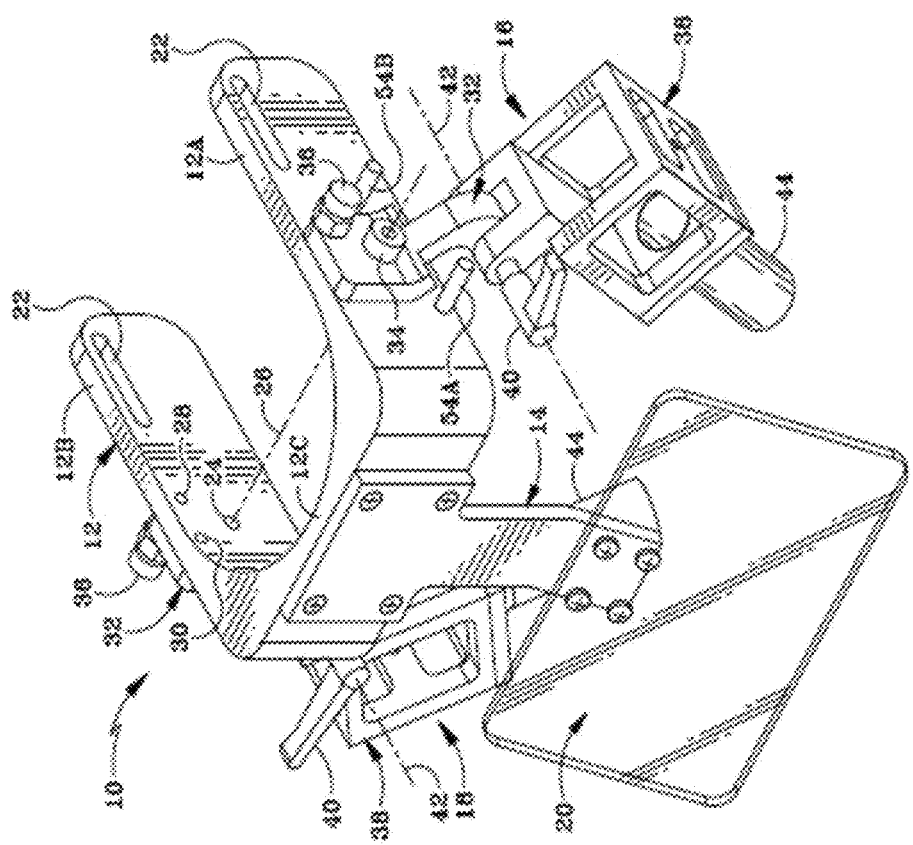
FIG. 3 is a top isometric view of the light source holding apparatus according to one example.

The first holding member 16 and the second holding member 18 are substantially mirrored about a central longitudinal axis and as such, for brevity, portions of which have been given similar reference numerals. Reference may be made with respect to the first holding member 16, however it is to be understood that a similar structure and function applies to second holding member 18. Each holding member 16, 18 includes an arm 32 that is rotatably connected to the U-shaped body 12 via a screw 34 extending through aperture 24. Screw 34 enables the arm 32 to pivot or rotate in a longitudinal plane about transverse axis 26. A spring-loaded button 36 is connected to arm 32 and may be releasably attached to extend transversely through the arm 32. When the arm 32 is in the lowered first position (as shown in FIG. 3) the button 36 is secured in first hole 28. As will be described in greater detail below, when the arm 32 of the holding member is rotated in a longitudinal direction about transverse axis 26, the button 36 disconnects from its connection with the first hole 28 and is inserted into the second hole 30.

A lower frame 38 is connected near the lower end of the arm 32 via a pivot connection which may be securely tightened by a handle or knob 40. The handle or knob 40 is connected via a pin establishing a longitudinal axis 42 about which the lower frame 38 pivots relative to the arm 32. Accordingly, when the handle or knob 40 is loosened, the lower frame 38 may pivot in a transverse plane about the longitudinal axis 42. Thus, each holding member 16, 18 can move in a longitudinal plane about a transverse axis 26 or may move in a transverse plane about a longitudinal axis 42. This movement provides functionality of illuminating the microelectronic circuit 7 with the blue light source 3 carried by the lower frame 38. Additionally, focus tubes 44 may assist in the direction of blue light downwardly towards the microelectronic circuit 7 below the viewing device 2. Additionally, the holding apparatus may translate or move up and down inasmuch as it is connected with the viewing device 2 which can move up and down as one having ordinary skill in the art would understand.

The first holding member 16 and the second holding member 18 may move independently relative to each other. For example, as indicated in FIG. 4-FIG. 7, the first holding member 16 may be pivoted from the lowered first position towards the raised second position (FIG. 7) by an angle θ. However, the second holding member 18 may remain in the lowered position when the first holding member 16 is in the raised position, or vice-versa. Raising either the first holding member 16 or the second holding member 18 enables an operator to access the microelectronic circuit 7 beneath the viewing device 2 in the event the holding members 16, 18 need to be lifted out of the way.

The bracket 14 is connected via a rigid connection with a central leg 12C. The bracket 14 extends downwardly to enable the shield 20 to connect thereto via a set of screws, however other connections are possible.

FIG. 4 and FIG. 5 depict the operational movement of the first holding member 16 and the second holding member 18. The handles or knobs 40 may be loosened and the respective holding members 16, 18 may be pivoted in the transverse plane about the longitudinal axis 42 as indicated by arrows A. The knob 40 may be loosened and the first holding member 16 may be pivoted upwardly so as to be raised and lowered depending on the size of the circuit 7 to be illuminated and the angle at which the circuit 7 is placed relative to the viewing device 2. Similarly, the second holding member 18 may be pivoted about longitudinal axis 42 and may be moved in the direction of arrow A upwardly or downwardly in a pivoting manner to direct light generally in the direction of axis 52. The pivoting movement can also serve as an adjustment in order to angle the axis 52 in a different direction or region of the circuit 7 to be illuminated.

Figure 6:
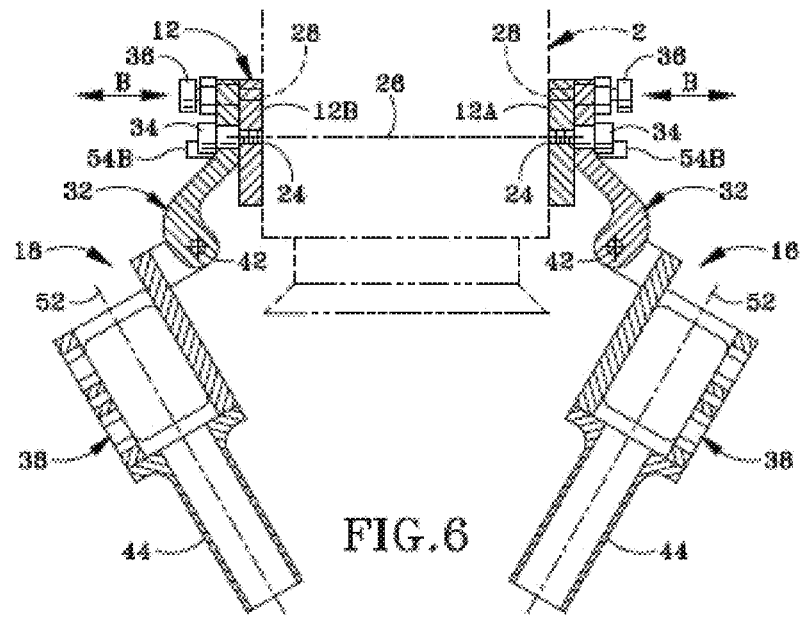
FIG. 6 is a cross section of the light source holding apparatus taken along line 6-6 of FIG. 5.

FIG. 6 and FIG. 7 depict the movement of each holding member 16, 18 in a longitudinal direction about the transverse axis 26 between the lowered first position and the raised second position. In order to effectuate movement from the lowered first position to the raised second position (FIG. 7), the button 36 may be pulled outwardly in the direction of arrow B to disengage a pin from the first hole 28. Each holding member 16, 18 may be pivoted about transverse axis 26 via a pin or screw 34 and upwardly in the direction of arrow C (FIG. 7). The angle θ at which the holding member assembly rotates in the direction of arrow C is limited by at least one stop block or stop pin. In one particular example, a first stop pin 54A and a second stop pin 54B are provided on the arms of the U-shaped body 12 in order to limit the angular travel in the direction of arrow C of each respective holding member 16, 18. In one embodiment, the angle θ at which each holding member 16, 18 pivots about transverse axis 26 is in a range from about 30° to about 90°. However, in one particular embodiment, the angle θ between the lowered first position and the raised second position is about 60°.

Figure 8:
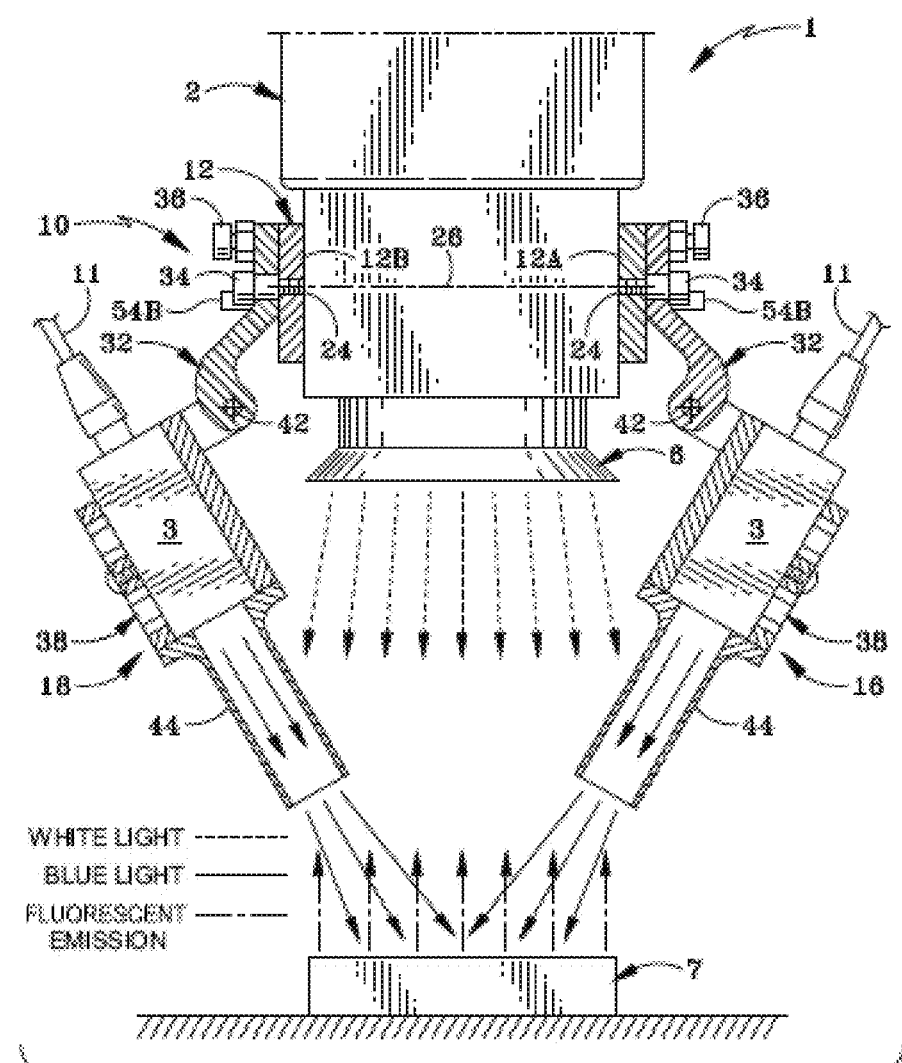
FIG. 8 is an operational cross-section of the light source holding apparatus taken along line 4-4 of FIG. 1.

As depicted in FIG. 8, one embodiment of system 1 includes the first holding member 16 and the second holding member 18 housing a blue light source 3. The blue light source 3 is configured to emit blue light towards the circuit 7. The blue light is indicated in FIG. 8 by solid arrows. Further, a general white light source 6 may exist on the viewing device 2 and white light may be shined towards the circuit 7 as indicated in FIG. 8 by dashed arrows. As will be described in greater detail below, the blue light source is configured to fluoresce contaminant particles on the circuit 7. In one example, the contaminant particles may be portions of epoxy resin, and more particularly, organic epoxy resin, that are excessive resin (i.e., adhesive material) on the electronic circuit in regions of the circuit other than where the electrically conductive element (i.e. wires) 50 is bonded to the circuit substrate. In another example, the contaminant particles may be portions of phenolic resins, and more particularly, organic phenolic resins, that are excessive adhesive materials on the electronic circuit in regions of the circuit other than where the electrically conductive element (i.e. wires) 50 is bonded to the circuit substrate. The phenolic resin may be phenol cyanate ester resin. The phenolic resin may be phenol formaldehyde.

The filter 4 may be housed in the viewing device 2. In one example, the filter can filter out all wavelengths less than 515 nm (i.e., the selected filter wavelength). However, in other examples, the selected filter wavelength can be altered depending on the particular purpose. Thus, it can be less than 515 nm or greater than 515 nm. The filter may be positioned anywhere in the viewer device's 2 optical light path as long as it does not prevent the blue (or indigo) light from illuminating the sample. In one example, the filter 4 is positioned between the main body of the scope and the two eyepiece tubes. In one example, it is desirable to have a band pass filter instead of a short pass filter or a long pass filter, however a long pass filter can still be used as well.

In one example, the filter 4 has a selected filter wavelength that is configured to filter out all wavelengths less than the selected filter wavelength. In one example, the selected filter wavelength is selectively set by a user to be greater than the initial excitation wavelength of the blue light. In a further example, the selected filter wavelength may also be less than the fluorescing response wavelength of the excited particulate or contaminant on the microelectronic circuit. Stated otherwise, when the excitation wavelength is a first wavelength in a blue spectrum region, and the fluorescent response wavelength is a second wavelength greater than the first wavelength, the selected filter wavelength is in between the first wavelength and the second wavelength. In one example, the blue excitation wavelength is about 465 nm, the fluorescent response feedback wavelength is about 550 nm, and the selected filter wavelength is about 515 nm. This enables filter 4 to filter out any blue light less than 515 nm viewed through the eye piece of stereo microscope 2 but still permits the transmission of the greater wavelength fluorescent feedback second wavelength through the eye piece so as to enable the operator to detect that contaminants are present on the microelectronic circuit.

It is to be understood that different epoxies or other contaminants fluoresce at different wavelengths. Thus, in one example filters 4 with stereo microscope 2 may be interchanged to provide for additional applications for each filter bandwidth. Filters 4 may be easily changed out as required. Filters 4 may also remain in the apparatus and slide, pivot, or move in some other manner as required to select different filters 4 for different wavelengths. In such an example, filter 4 may be removably attached to the microscope 2 so as to enable filter 4 to slide or otherwise pivot out of alignment from the optical view path. In another example, a plurality of filters 4 may be formed from a glass material and can be provided to the user in a kit format depending on the desired selected filter wavelength. The plurality of filters 4 may be formed from a plastic material or a mineral-based material. For example, the user may have a single stereo microscope 2 and a kit of a plurality of filters wherein each filter has a different selected wavelength. For example, a first filter 4 may include a selected filter wavelength of 400 nm. A second filter 4 may have a selected filter wavelength of 450 nm. A third filter 4 may have a selected filter wavelength of 500 nm, and so on. The functionality of the kit provided with a plurality of filters 4 would enable the user to detect a variety of contaminants depending on the fluorescent feedback wavelength. Recall, the fluorescent feedback has a wavelength greater than the initial excitation wavelength and the selected filter wavelength is intermediate (i.e., between) the first excitation wavelength and the second fluorescent response wavelength.

The following tables relate to the resultant fluorescent intensity of different epoxy resins (i.e., contaminants) that may be found on a microelectronic circuit as indicated in further detail below with respect to FIG. 9 and FIG. 10. Table 1 depicts the results of various excitation wavelengths (the first wavelength) and the resultant fluorescent intensity observed in a return fluorescent feedback wavelength of about 550 nm for Ablebond Epoxy. As indicated in Table 1 below, the greatest resultant fluorescent intensity for an Ablebond 8175 Epoxy resin contaminant on the microelectronic circuit is seen when the initial excitation emission first wavelength is about 475 nm or about 500 nm. In this instance, the filter 4 used in microscope 2 to view the fluorescent return second wavelength of about 550 nm should be in between the first wavelength and the second wavelength (i.e., the selected filter wavelength should be greater than 500 nm and less than 550 nm, such as 515 nm).

TABLE 1

Excitation wavelength and resultant fluorescent intensity of Ablebond 8175 epoxy resin at a fluorescent return wavelength of about 550 nm

| Excitation Emission (nm) | Resultant fluorescent intensity |
| --- | --- |
| 350 | 50,000 |
| 375 | 200,000 |
| 400 | 300,000 |
| 425 | 500,000 |
| 450 | 750,000 |
| 475 | 1,000,000 |
| 500 | 1,000,000 |

Table 2 similarly reflects the excitation emission and resultant fluorescent intensity for a different type of epoxy resin contaminant, namely, Ablebond/Henkel 84-3 "Blue Glue." The greatest resultant fluorescent intensity of the Ablebond/Henkel 84-3 "Blue Glue" occurs within an excitation emission first wavelength of about 450 nm. Thus, since the known resultant fluorescent return second wavelength is about 513 nm, the filter 4 in this scenario would need to be between the excitation emission first wavelength of 450 nm and the fluorescent return second wavelength of about 513 nm. Thus, the filter 4 in this example would be greater than 450 nm but less than 513 nm.

TABLE 2

Excitation wavelength and resultant fluorescent intensity of Ablebond/Henkel 84-3 "Blue Glue" epoxy resin at a fluorescent return wavelength of about 513 nm

| Excitation Emission (nm) | Resultant fluorescent intensity |
| --- | --- |
| 350 | 25,000 |
| 375 | 75,000 |
| 400 | 125,000 |
| 425 | 200,000 |
| 450 | 250,000 |

Each of the aforementioned examples and respective tables indicate that the present disclosure may be expanded to a variety of different wavelengths so long as the selected filter wavelength is greater than the excitation emission first wavelength and less than the fluorescent return second wavelength.

Figure 9:
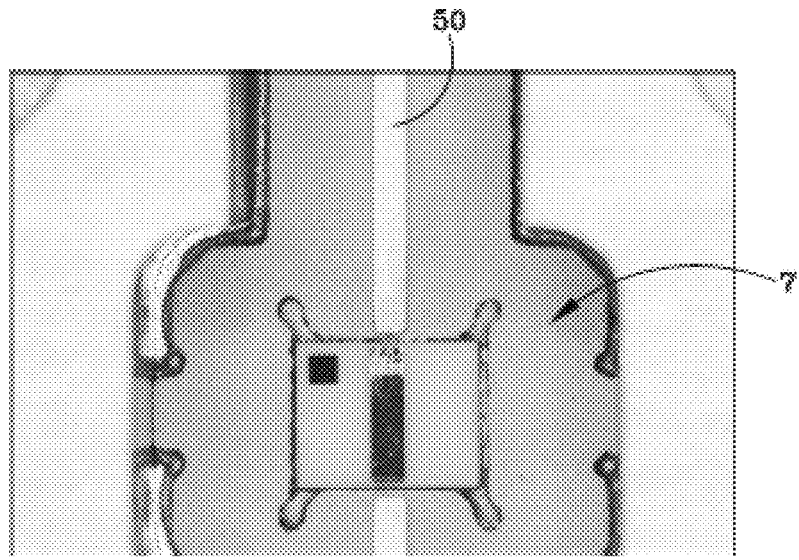
FIG. 9 is a grayscale image taken by the microscope when a blue light is off and a white light is turned on to illuminate a circuit.
Figure 10:
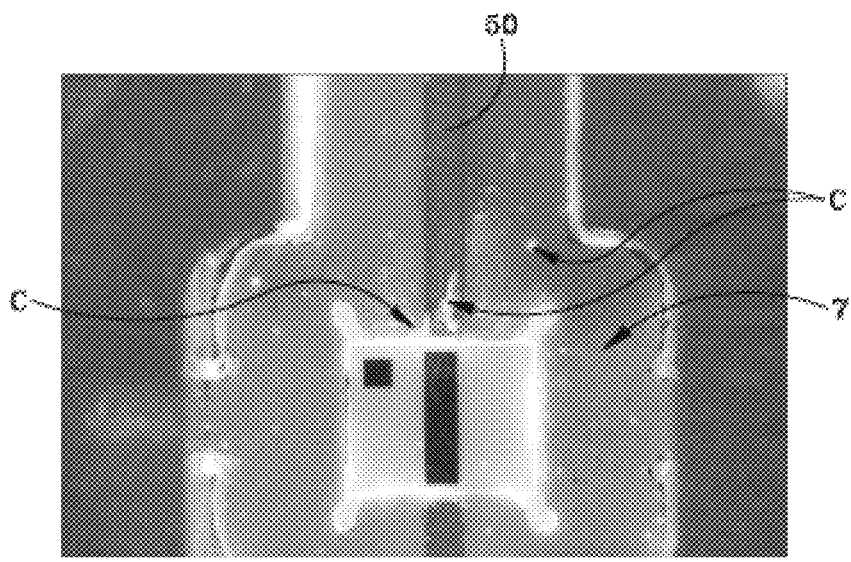
FIG. 10 is a grayscale image taken by the microscope when the blue light is on and viewing the circuit through the filter so that the fluorescence emission is made visible.

FIG. 9 and FIG. 10 illustrate the result of using this particular system for detecting an organic epoxy resin formed on a microelectronic circuit board 7. FIG. 9 is an image taken only by illuminating a white light on the circuit board 7. As shown in FIG. 9, the figure shows no human visible sign of an epoxy resin on the circuit board. On the contrary, FIG. 10, which utilizes a blue light of wavelength near 460 nm combined with a Chroma glass filter 4 which can filter out wavelengths less than 515 nm, clearly shows contamination C of epoxy resin particles on the circuit board 7 and on the gold wiring 50.

Figure 11:
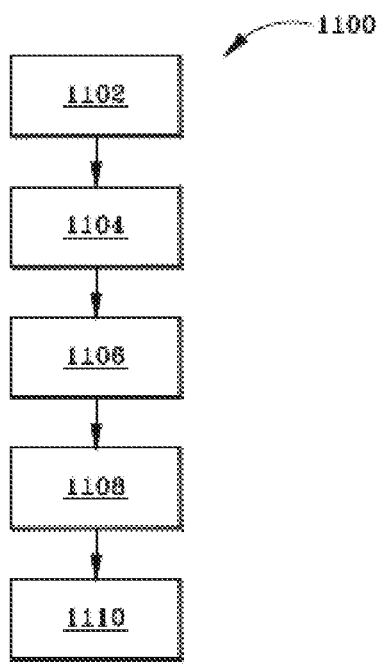
FIG. 11 is an exemplary flow chart for a method of detecting an epoxy resin on a microelectronic circuit board associated with the present disclosure according to one example.

FIG. 11 depicts an exemplary flow chart of a method 1100 for detecting contaminant (i.e., contaminant C) on an electronic circuit 7. The method 1100 may include providing an electronic circuit including an electrically conductive element 50 bonded to a substrate, which is shown generally at 1102. The method 1100 may also include emitting a light having a first wavelength toward the electronic circuit, which is shown generally at 1104. The method 1100 may also include effecting excitation of particles on the electronic circuit with the light having the first wavelength, wherein the particles generate a fluorescent feedback second wavelength in response to the excitation and the second wavelength is greater than the first wavelength, which is shown generally at 1106. The method 1100 may also include viewing the fluorescent feedback second wavelength through a filter 4 having a selected filter wavelength that is greater than the first wavelength and less than the second wavelength, which is shown generally at 1108. The method 1100 may also include determining whether contaminants are present on electrically conductive element based on viewing the fluorescent feedback second wavelength through the filter and one of (i) throwing away the electronic circuit and (ii) repairing the electronic circuit in response to the determination of whether the contaminant is present, which is shown generally at 1110. Stated otherwise, if the system determines that contaminants C are present, then the manufacturer may throw away circuit 7 or may elect to clean (i.e., repair) circuit 7.

The method 1100 of detecting contaminant from organic epoxy present on the circuit 7 may also include emitting blue light from the blue light source 3 and the first wavelength is in a range from about 400 nm to about 500 nm. In this scenario, the blue light source may be powered from the viewing device 2 or an external power source. In a more particular example, the first wavelength may be in a range from about 450 nm to about 475 nm, and the fluorescent feedback wavelength may be greater than about 500 nm.

The method 1100 of detecting contaminant from organic epoxy present on the circuit 7 may also include determining whether the contaminants are excessive adhesive material on the electronic circuit in regions of the circuit other than where the electrically conductive element is bonded to the substrate. This occurs during the manufacturing process of circuit 7 when the electrically conductive elements 50 (i.e., wires or ribbons, which are often gold) are bonded to the circuit substrate. Sometimes the adhesive material (i.e., the organic epoxy) can bleed out from the bonding region and deposit in other undesired locations which contaminate the circuit 7 and reduce its efficiency for conducting electrical signals. System 1 effectuates the fluorescent feedback second wavelength via one or more organic component(s) included in the epoxy resin.

The method 1100 of detecting contaminants on the electronic circuit may also include selecting the selected filter wavelength based on components present in an adhesive material used to bond the electrically conductive element to the substrate. As presented above in Table 1 and Table 2, the type of bonding material or epoxy used to construct the circuit is typically known in advance. Further, each epoxy fluoresces at different feedback wavelength based on the different organic components/make-up of the epoxy. Thus, since the known fluorescent feedback wavelength is known, a filter is selected that is less than the fluorescent feedback second wavelength but greater than the blue light first wavelength.

In one exemplary operation, an operator attaches a light source for emitting the light having the first wavelength to the one of the microscope and the stereoscope. This could be accomplished by installing the light source holding apparatus 10 on a microscope or stereoscope or other viewing device 2. Then, the operator provides or places a microelectronic circuitry board under the microscope. Second, the operator installs at least one blue light source into a holding member of the apparatus 10. The blue light source must be aligned with the cylinders of the light guiding tubes 44 so that the tubes can properly deliver the blue light beam to the microelectronic circuitry board. Thirdly, the blue light source 3 is turned on, and the light guiding tubes 44 are adjusted so that the blue light source can focus on the desired area on the circuit board. The operator then turns on the white light on the microscope and aligns the microelectronic board with the white light of the microscope. The filter 4 is installed in the viewing device 2 to wipe out (i.e., filter) all the unnecessary wavelengths less than the selected filter wavelength. As long as the filter is aligned with the viewer's optical light path, it can be installed anywhere in the viewing device.

In one example, a method of detecting an epoxy resin on a microelectronic circuit board 7 may include providing a circuit board which is contaminated with an epoxy resin and viewed under a stereo microscope. Then, a light is emitted with a wavelength near a blue color. The blue color light is pointed towards a desired spot of the microelectronic circuit board. A filter which is placed in the stereo microscope is provided to filter out any light which has a wavelength less than a selected filter wavelength. Resultant fluoresced light from the microelectronic circuit board is received through the filtering process so that the operator can detect an epoxy resin on the microelectronic circuit board.

Figure 12:
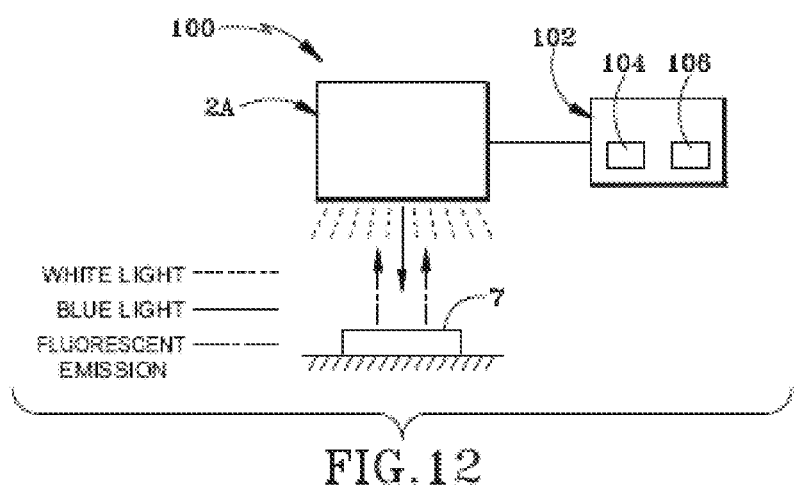
FIG. 12 is a schematic view of a computer implemented detection system according to one example.

As depicted in FIG. 12, another exemplary system of the present disclosure could be implemented through a computer implemented detection system 100 that would not require a human eye to detect the fluorescing particles. Rather, a computer 102 having a non-transitory computer readable storage medium 104 with instructions encoded thereon for execution in one or more processors 106 could detect the fluorescing particles such contaminants C on circuit 7. The computer implemented contaminant detection system 100 would rely on automated optical inspection technology integrated with logic functions configured to detect the contaminants C on microelectronic circuit 7. Furthermore, as used herein, the computer implemented contaminant detection system 100 may also be referred to as an automated optical inspection system. The optical component provided below may be generally referred to as a viewing device 2A. As one having ordinary skill in the art would understand, a general viewing device 2A could be the automated optical inspection system. In one example, the viewing device is an imaging system such as a camera configured to capture one or more images of the target and fluorescing particles. The capture images are then transmitted to the computer 102 for the subsequent processing. In one example the imaging system 2A captures the images and transmits the images by wired or wireless means to the computer 102.

In this example, the computer implemented contaminant detection system 100 for detecting contaminants on an electronic circuit may include: an electronic circuit 7 having electrically conductive element 50 bonded to a substrate; a viewing device 2A; a first light source 3 emitting light at a first wavelength towards the electronic circuit configured to excite particles on the electronic circuit 7; a fluorescent feedback second wavelength of the excited particles generated in response to particle excitation from the first light source, wherein the second wavelength is greater than the first wavelength; at least one non-transitory computer readable storage medium 104 in having instructions encoded thereon that, when executed by one or more processors 106, result in the following operations for detecting contaminant material on the electronic circuit, the operations configured to: (a) emit light from the first light source 3 at the first wavelength toward the electronic circuit; (b) effect the excitation of particles on the electronic circuit with the light having the first wavelength, wherein the particles generate the fluorescent feedback second wavelength in response to the excitation and the second wavelength is greater than the first wavelength; (c) view the fluorescent feedback second wavelength with the viewing device; and (d) determine whether contaminants are present on electrically conductive element based on viewing the fluorescent feedback second wavelength.

This computer implemented system 100 would not necessarily need a physical filter 4 inasmuch as the computer 102 could be programmed to view the second wavelength without the physical filter. Accordingly, a filtering logic function could be programmed into the computer 102 to eliminate the need of the physical filter, however, the filtering logic function(s) could accomplish a similar result. For example, a basis filter function or algorithm can be included in the instructions on medium 104 which would filter out the blue light received by the viewing device (i.e., the automatic optical inspection system). In this instance, a blue light would emit towards the circuit 7. Then, the entire feedback would be received in the viewing device. Then, the logic functions implemented by computer process could digitally filter out all wavelengths received in the viewing device below a selected digital filter wavelength. For example, the blue light may be emitted at about 465 nm. Then, the circuit is viewed by viewing device 2. Thereafter, the logic filter functions are executed by one or more processors 106 to filter out all wavelengths from the viewing device 2A that are greater than the wavelength of the original blue light emission but less than the known resultant fluorescent second feedback of the epoxy or other contaminant. The computer 102 can use this information to determine whether the contamination is present and recommend whether to throw away/discard the circuit 7 or repair the circuit 7.

The power utilized to generate blue light from blue light source 3 may be varied depending on the optical inspection device 2A or viewing device 2 utilized in the system. For example, if the optical inspection device 2A (or 2) is a highly powerful viewing device, then less power may be needed to generate the light from the blue light source. Alternatively, if the optical inspection viewing device 2A is a lower power device (i.e., with less magnification), then a higher powered blue light source may be required (such as a blue laser).

One embodiment of the computer implemented detection system enables the rapid detection of contaminants C via an automated optical inspection (AOI) system when using the appropriate lighting and filters. The light filtration of the AOI is performed either with a lens and filter allowing only a specified range of wavelengths to reach a detector or via processing of a broad spectrum image to eliminate the excitation wavelength. The fluorescence intensity is accurately measured and specific wavelengths monitored to identify specific contaminants C. Within those wavelengths, the emission intensity is used to determine the thickness and/or concentration and/or location of the contaminant Rejection criteria is determined and quantitatively monitored. The rejection criteria can be coded on the instructions stored in the non-transitory computer readable storage medium 104. In one example, the rejection criteria establishes a threshold of the emission intensity based on the system design and application. In one particular embodiment, rejection criteria intensity values of fluorescence is measured in arbitrary "counts" rather than photon counting or any other similar quantitative, tangible value. The particular instrument utilized may give a different result, as would every contaminant due to changes in fluorescence efficiency. Thus in the AOI system, the intensity which determines a reject would have to be concluded experimentally for each new situation. Also, any user would have to internally define rejection criteria as some products may be more sensitive to contamination than others. Essentially, testing of the rejection criteria intensity values would be determined empirically.

In a further embodiment, other excitation wavelengths such as violet, indigo, blue and green light are used for the excitation depending upon the specifics of the inspection. The appropriate optical filter for the excitation wavelength is used for the respective emission frequency in accordance with the Stokes shift in the response.

Further, the one or more processors 106 implementing the instructions from the non-transitory computer readable storage medium 104 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), or any other suitable portable or fixed electronic device.

Also, the computer 102 (which may be a smartphone) may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Figure 13:
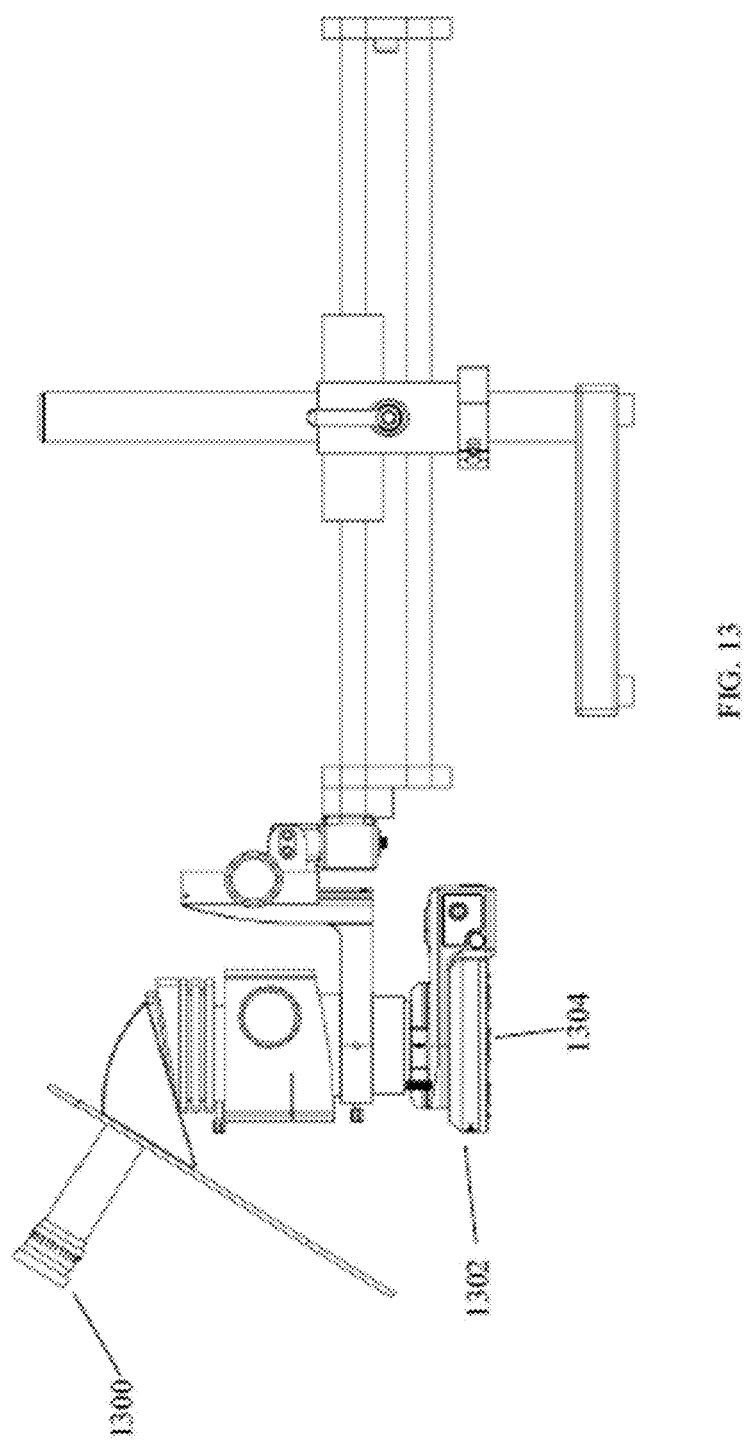
FIG. 13 is a side view of the system of the present disclosure according to one example.
Figure 14:
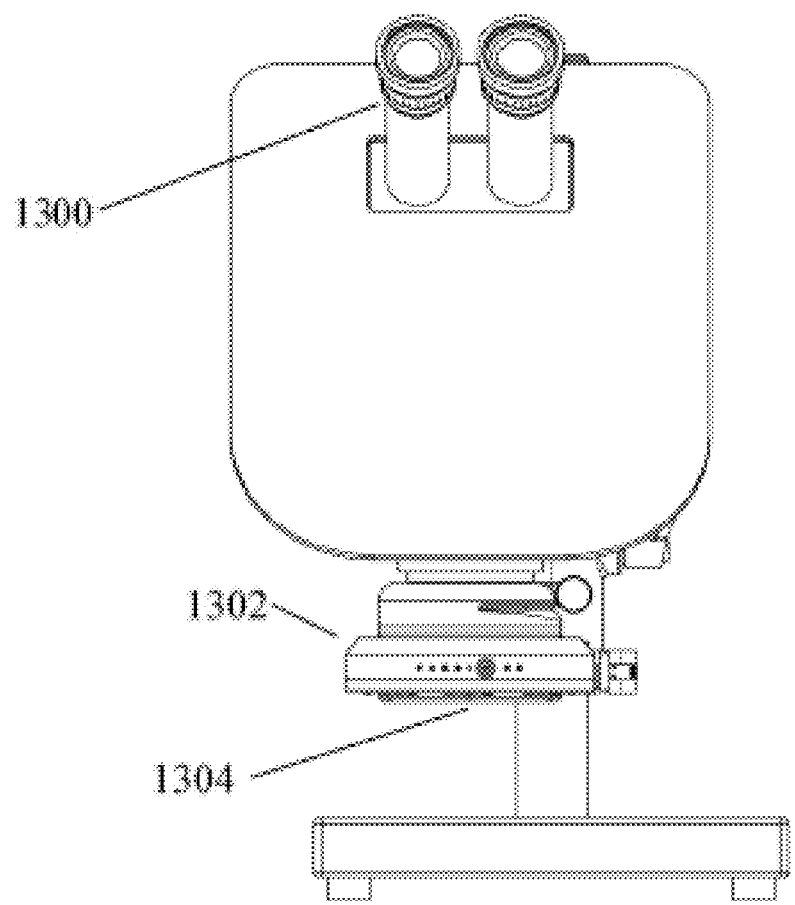
FIG. 14 is a front view of the system of the present disclosure according to one example.
Figure 17A:
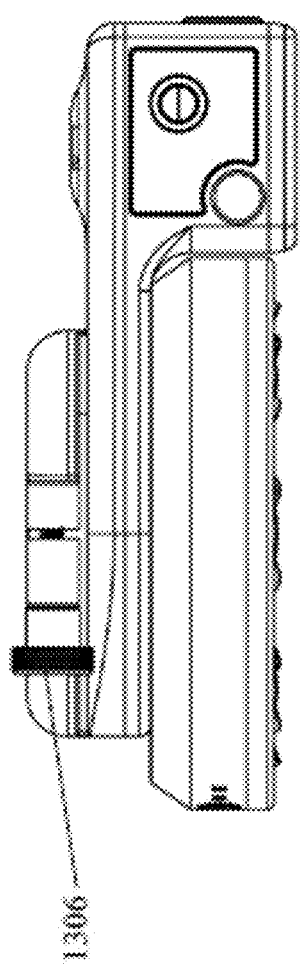
FIGS. 17A-17B are side views of the unit housing the light subsystem, passive cooling subsystem, and the shutter module according to one example.
Figure 17B:
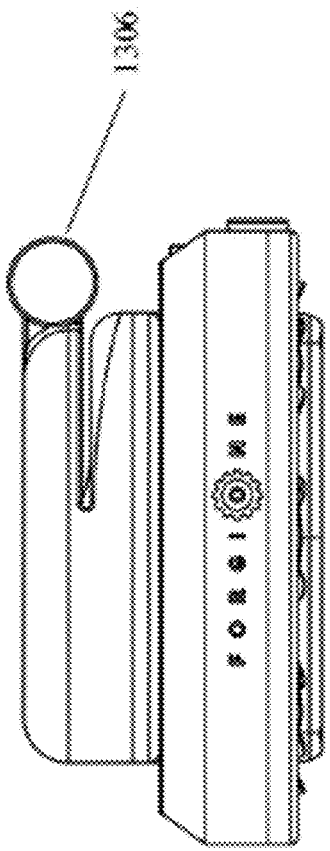

As depicted in FIGS. 13-15, the system of the present disclosure comprises a viewing device 1300 coupled with a light subsystem 1302 and a shutter module 1304. In one embodiment, the viewing device 1300 may be a stereo microscope. In one embodiment, the viewing device 1300 includes an imaging systems such as a camera configured to allow for capturing images of the target and the reflected fluorescing particles. In a further embodiment the viewing device is a microscope and an imaging camera such that the images are captured but also allowing an operator to use the microscope when looking at a particular target. The camera in one example is integrated into the viewing device and views the same image that would be viewed by the operator. In another example the camera is attachable to the microscope. The captured images can be viewed on a monitor facilitating the inspection process and allowing the operator to view a monitor with the target and fluorescing particles. A hood can be placed over the microscope to keep out background light. In one example the images are subject to processing to automate or semi-automate the process. The captured images in one example are analyzed to determine the presence of the fluorescing particle and the extent of the fluorescing particles. For example the captured images may indicate that a certain amount of fluorescence exists but it within a prescribed region and at an acceptable level. In one example the level of emissions reflected it measured and while some levels are acceptable, higher levels that may be established by diagnosing faulty targets establish the unacceptable level. Regions or windows can be assigned to sections of the images to aid in determining whether the condition presents a problem. If the fluorescing particles are outside of acceptable regions or at levels higher than an acceptable level, an error condition can be indicated such as by audio or visual means. If there is an error condition, an operator may then view the target and make a further assessment or remedy the condition. In a more fully automated example, the target would be indicated as a failure and further processing would be required. In an automated system, the targets reside on a conveyer or platform such as a pick-and-place platform that places targets in the proper location for analysis. According to one embodiment, images of each target and the corresponding fluorescing particles are captured and stored with the corresponding time stamp to better enable quality control and making a record of the inspection for auditing purposes. Upon a failure in the field, the captured images can be used to perform forensics and diagnosis of the fault.

The system of the present disclosure in one example utilizes viewing devices 1300 with 80 mm objectives. The viewing device 1300 may be a pair of glasses or goggles with filters built into them and the light source attached to the glasses or goggles, thereby creating system that could be used out in the field. The viewing device may include a computer screen or display screen that shows an image of the specimen rather than the user looking through a microscope or stereo microscope. It may also utilize viewing devices 1300 with 58 mm objectives as well as any objective size between 58 mm and 80 mm.

The light subsystem 1302 in one example comprises multiple LED arrays in an integrated form factor thereby reducing costs and providing enhanced imaging capability. This embodiment eliminates the need for the side mounting arms. In one example there are a plurality of individual LEDs for white light, blue light and ultraviolet. In one example eight individual LEDs for each of white, blue and ultraviolet were arranged in the light subsystem. The number of LEDs can vary and between 4-12 seem to provide sufficient light and in a small form factor. The individual LEDs can be arranged in various ways to provide uniform light on the target by placing the LEDs around the light subsystem 1302. In one example the LED array has a number of blue lights mounted close together and focused onto the position of the target. In another example the blue light LEDs are located around the periphery of the circular ring that forms the light subsystem. An embodiment comprises the blue light source LED array, which has a wavelength in a range from about 400 nm to about 500 nm. The present implementation employing white, blue and UV light sources allows for detecting an array of different fluorescing particles as well as conventional imaging using white light. Similar to the blue light, the UV light interacts with fluorescing particles on the target and causes fluorescing particles to emit a fluorescing emission at a different wavelength that is filtered and can be viewed by the viewing device.

Additionally, the objective may be movable, thereby facilitating automation of the system of the present disclosure. The lights may be trunnion-mounted lights, thereby allowing the system to point the lights directly at a target. This direct illumination allows for greater power density and power efficiency. Additionally, directly angling the lights at the target helps eliminate any shadows that might occlude areas of interest. The target may be an electronic circuit. The target may also be a specimen in the life sciences field. The target may be an area of interest, which a user wants to inspect or view. The system of the present disclosure detects fluorescing particles, where these particles naturally fluoresce on their own when exposed to certain wavelengths. In one example, the fluorescing particles may be biological samples such as proteins. Some proteins or small molecules in cells are naturally fluorescent also referred to as autofluorescence. In other applications, a fluorescent dye that can be a small molecule, protein or quantum dot is used to as a tag and enables fluorescing. In a further example the fluorescing particles may be contaminants from residual epoxy resins or phenolic ester resins used in the microelectronics industry. Fluorescing particles may be any substance that naturally fluoresces without additives when exposed to certain wavelengths.

As depicted in FIGS. 13-17B, the system of the present disclosure comprises a clamping module 1306. The clamping module 1306 allows the light subsystem 1302, shutter module 1304, and passive cooling subsystem to collectively attach as a singular unit (hereinafter the unit) to the viewing device 1300 in a removable manner. The clamping module 1306 may fasten the unit directly to the viewing device 1300. The clamping module 1306 may attach the unit to a carrier that allows for greater mobility. Further, the clamping mechanism may be accomplished by, but is not limited to, the following variations: a physical lever, a cam lock, a threading mechanism, a nut and bolt fastener, and a C-clamp.

In accordance with FIGS. 18A and 18B, the light subsystem 1302 in this example comprises a ring structure 1800 where the lights are arranged in a circular manner around the aperture 1802 for the shutter and filter and angled towards the target, thereby allowing direct illumination of the target. The LED arrays include white LEDs 1806, blue light LEDS 1808 and ultraviolet LEDs 1810 that are shown around the periphery of the aperture 1802. In one example there are multiple LED lights for each of white, blue light and UV such that there are settings for high, medium and low with control circuitry that control the number and/or intensity or both of the LED lights. The lights of the ring structure 1800 may also be arranged in a square, hexagonal, or octagonal configuration in some embodiments. There may be a switch 1804 situated on the system to turn the lights on and off. In a further example the system operates in a hands free mode by using the foot pedal for the lights, filter and shutter. The lights may be encapsulated in a total internally reflected optic configuration. This configuration allows the light subsystem to aim the lights directly at the target rather than flooding the entire target under inspection. In one embodiment, the optics may be a prism shape. In one embodiment, the system may include a shutter module. The shutter module comprises at least one filter. The filter may be a long pass filter, but it may also be a band pass filter or a short pass filter. Filters may be changed out as required. Filters may also remain in the apparatus and slide, pivot, or move in some other manner as required to select different filters for different wavelengths. In one example, a filter may be removably attached to the stereo microscope so as to enable the filter to slide or otherwise pivot out of alignment from the optical view path. The system of the present disclosure may also have an electrostatic discharge (ESD) coating in order to minimize any ESD created.

Figure 19:
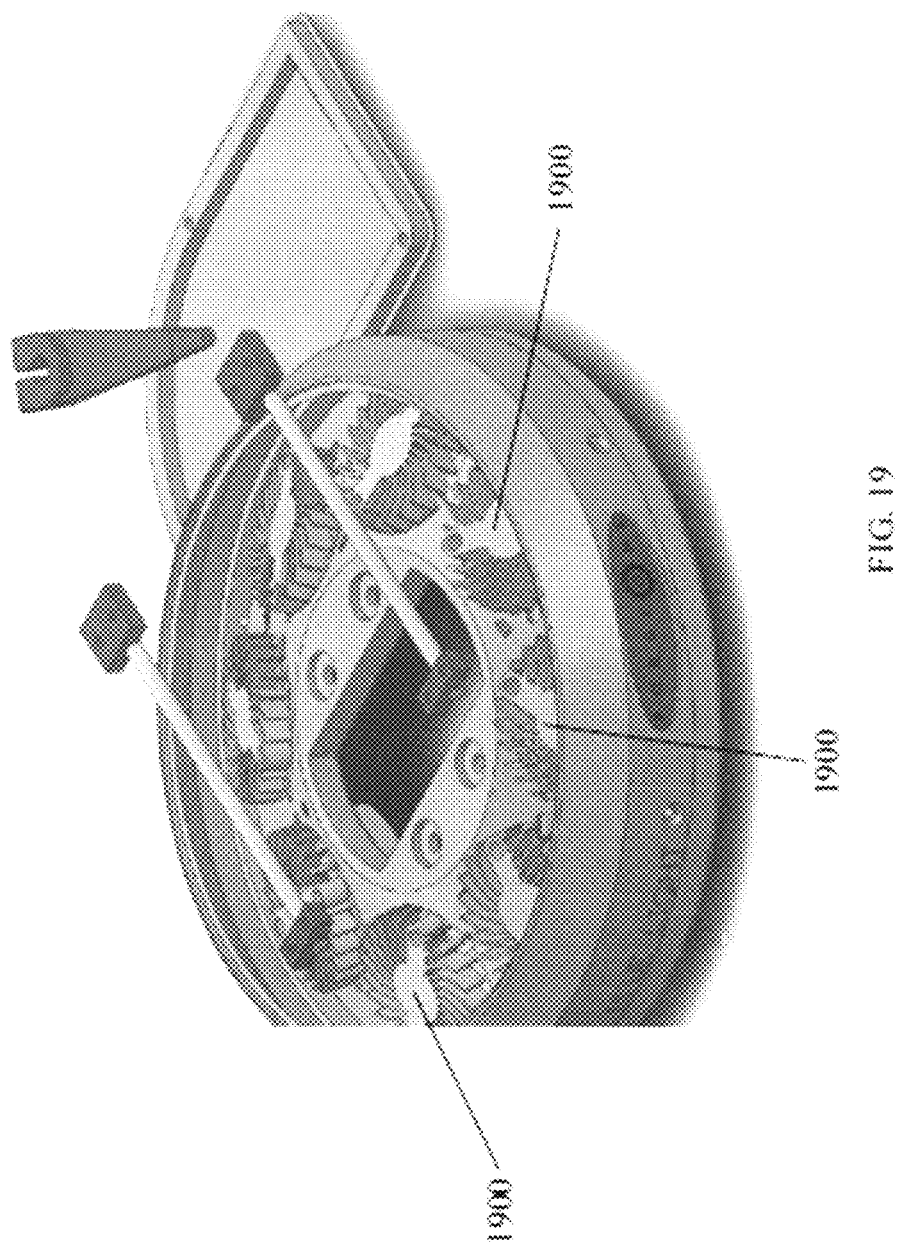
FIG. 19 is an exploded view of the unit housing the light subsystem, passive cooling subsystem, and the shutter module according to one example.

As depicted in FIG. 19, the system of the present disclosure comprises a passive cooling subsystem configured to prevent overheating of the system without expending additional energy resources. Conventional systems tend to employ fans and active cooling subsystems that add cost and complexity. In contrast, one example of the present system employs passive cooling concepts detailed herein such that no additional energy resources are expended such as electricity. The passive cooling subsystem further comprises a plurality of spider heat sinks 1900, where these heat sinks 1900 help dissipate residual heat that builds up as a result of system operation. These spider heat sinks 1900 may be spaced equally apart from each other in a ring-like configuration around the shutter. In one embodiment, these spider heat sinks 1900 may be spaced in a configuration that conforms to the shape of the structure of the passive cooling subsystem.

Figure 20:
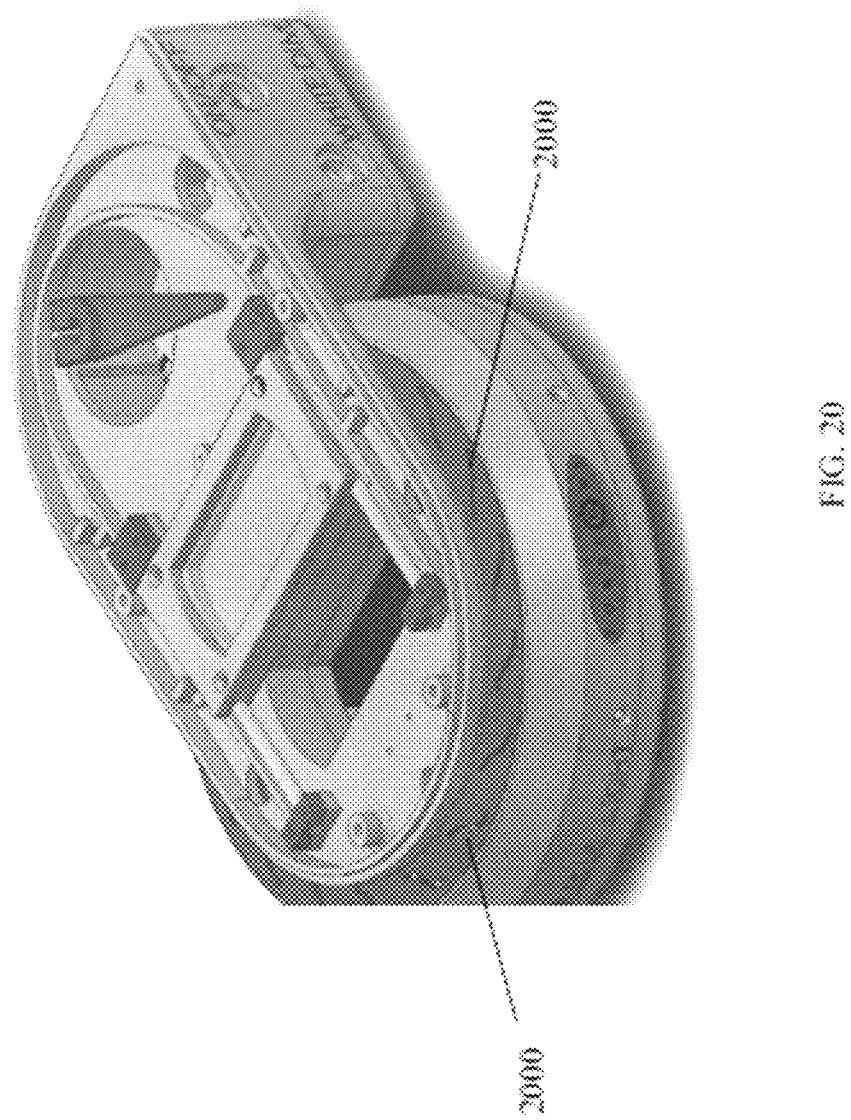
FIG. 20 is a perspective view of the unit housing the light subsystem, passive cooling subsystem, and the shutter module according to one example.

As depicted in FIG. 20, the passive cooling subsystem has a plurality of vents 2000 integrated throughout the system of the present disclosure. These vents 2000 allow excess heat generated from operation of the system to escape, thereby cooling down the system even if it remains on for an extended period of time. The passive cooling subsystem may have certain components of the system, including the light boards, made out of metal to better facilitate heat dissipation. The metal may be, but is not limited to, aluminum. The metal may be copper. The use of metal components helps increase the lifetime of the system while decreasing the amount of residual heat stored in the system during operation. The light boards may be made out of ceramic to facilitate heat dissipation.

As depicted in FIG. 21, a control arm 2100 may be spring wired to the shutter 1602 of the system, allowing the shutter 2102 to travel on the rails 2104, 2106. The shutter 1602 may laterally slide on the rails 2104, 2106 in relation to the system of the present disclosure. This movement mechanism allows for the design of the present disclosure to be smaller and more efficient. The shutter 2102 may be activated by a foot switch pedal operatively connected with the system of the present disclosure. In one embodiment, the shutter 2102 may be manually activated by a switch that can be configured by an operator. In one embodiment, the shutter 2102 may be manually activated by a lever or a button. The switch may be attached to the system itself. The switch may also be housed within a separate unit such as a foot pedal.

Figure 22C:
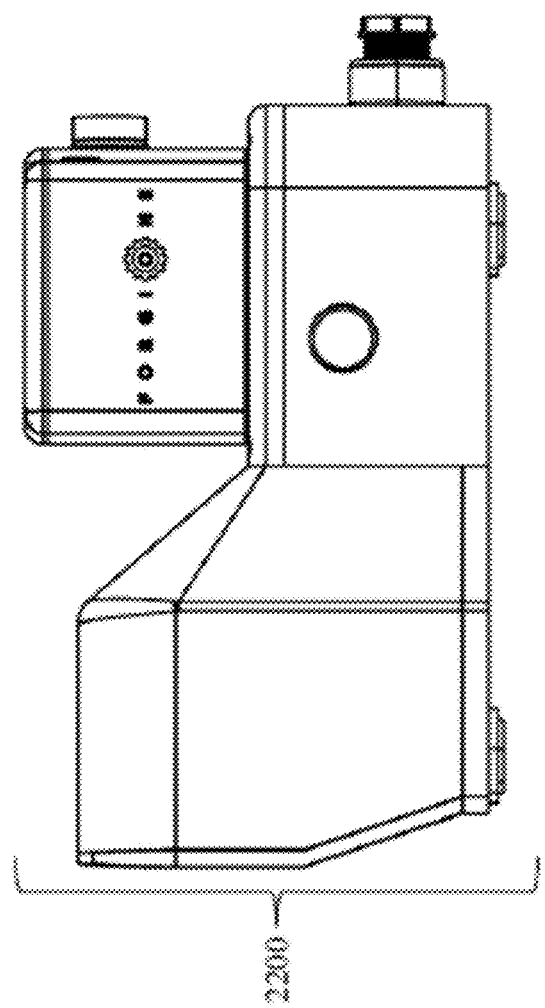
Figure 22B:
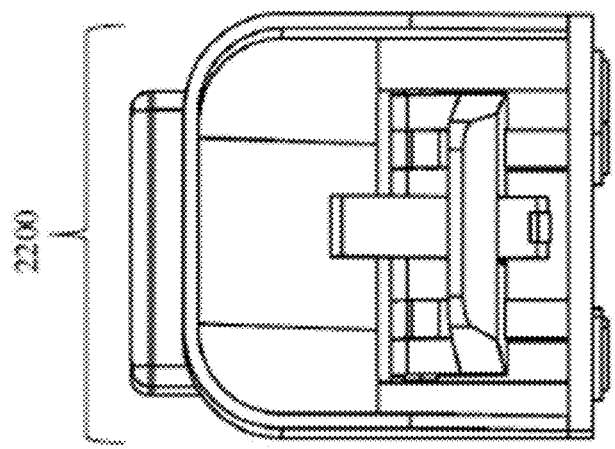

As depicted in FIGS. 22A-22C, the switch may be housed in a foot pedal 2200, allowing the operator to use the switch hands-free. In one embodiment, the switch may be housed in a separate pendant that can sit on top of a work bench next to the system of the present disclosure. In another embodiment, the switch may be a gravity switch that prevents the lights in the system from turning on if the system is ever flipped over for inspection. In yet another embodiment, the shutter 2102 may be activated if the viewing device detects the presence of contaminants by color. Shutter actuation may be accomplished by using a rotary solenoid in the shutter module. The shutter 2102 may rotate or slide in any direction. However, it is understood by those skilled in the art that other shutter mechanisms may be utilized.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various exemplary concepts may be embodied as a non-transitory computer readable storage medium (or multiple non-transitory computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

It is to be understood that a blue light source 3 can be an LED source or a laser source depending on the application. For example, if a broader area on a circuit substrate is required to be excited, then the LED source may be more desirable. If a small but strong light source is required, then a laser source may be more desirable.

Also, various concepts may be exemplified as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various examples or embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

All definitions, as defined and used herein, should be understood to control over dictionary definitions, definitions in documents incorporated by reference, and/or ordinary meanings of the defined terms.

"Logic", as used herein (for example "filtering logic"), includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one."

The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment or example, to A only (optionally including elements other than B); in another embodiment or example, to B only (optionally including elements other than A); in yet another embodiment or example, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment or example, to at least one, optionally including more than one, A, with no B present (and optionally including elements other than B); in another embodiment or example, to at least one, optionally including more than one, B, with no A present (and optionally including elements other than A); in yet another embodiment or example, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like such as "an example," means that a particular feature, structure, or characteristic described in connection with the embodiments is included in at least some embodiments or examples, but not necessarily all embodiments or examples, of the present disclosure. The various appearances "an example," "an embodiment," "one embodiment," "some embodiments," "one particular embodiment," or "other embodiments," or the like, are not necessarily all referring to the same embodiments or examples.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed is:

1. A system for detecting fluorescing particles on a target, comprising:
    a viewing device configured to view the target;
    a light subsystem configured to illuminate the target and having a white light source and a blue light source integrated into a single unitary housing, wherein the blue light source emits light at a first wavelength towards the target adapted to excite particles on the target at a fluorescent feedback second wavelength generated in response to particle excitation from the blue light source, wherein the fluorescent feedback second wavelength is greater than the first wavelength;
    a passive cooling subsystem configured to prevent overheating of the system without expending additional energy resources; and
    at least one filter in operative communication with the viewing device having a selected filter wavelength configured to allow light to pass that is greater than the first wavelength; wherein the fluorescing particles include an organic component that effectuates the fluorescent feedback second wavelength, and wherein the fluorescing particles that include the organic component are part of the target and are not a fluorescing agent, fluorescent material, or other fluorescing additive that is added to or mixed with the target.

2. The system of claim 1, wherein the light subsystem further comprises an ultraviolet light source in the single unitary housing.

3. The system of claim 1, wherein the passive cooling subsystem comprises a plurality of heat sinks or vents.

4. The system of claim 1, further comprising a switch operatively connected to the light subsystem and shutter module to control the operations.

5. The system of claim 4, wherein the switch is a foot pedal.

6. The system of claim 1, wherein the single unitary housing of the light subsystem comprises a ring structure and a plurality of blue light LEDs, a plurality of white light LEDs and a plurality of ultraviolet light LEDs.

7. The system of claim 1, wherein the viewing device comprises a camera for capturing one or more images of the target and the fluorescing particles.

8. The system of claim 7, further comprising at least one non-transitory computer readable storage medium having instructions encoded thereon that, when executed by one or more processors, result in operations configured to:
    process the images of the target and the fluorescing particles;
    determine whether the fluorescing particles are in an acceptable region and within an acceptable level; and
    provide an indication when the fluorescing particles are not in the acceptable region or within the acceptable level.

9. A system for detecting fluorescing particles on an electronic circuit, comprising:
    a viewing device adapted to view the electronic circuit having an electrically conductive element bonded to a substrate;
    a light subsystem configured to illuminate the electronic circuit, wherein the light subsystem comprises a first light source emitting light at a first wavelength towards the electronic circuit adapted to excite particles on the electronic circuit at a fluorescent feedback second wavelength generated in response to particle excitation from the first light source, wherein the fluorescent feedback second wavelength is greater than the first wavelength, and the first light source is a blue light source;
    a shutter module operatively engaged with the light subsystem, wherein the shutter module comprises at least one filter in operative communication with the viewing device having a selected filter wavelength configured to allow light to pass that is greater than the first wavelength;
    a passive cooling subsystem configured to prevent overheating of the system without expending additional energy resources;
    a removable connection between the at least one filter and the viewing device so as to allow other filters having different selected filter wavelengths to be utilized in conjunction with the viewing device;
    wherein at least some of the excited particles generated in response to particle excitation from the first light source are the contaminants on the electronic circuit;
    wherein the contaminants comprise a phenolic ester on the electronic circuit in regions of the circuit other than where the electrically conductive element is bonded to the substrate; and
    wherein the phenolic ester includes an organic component that effectuates the fluorescent feedback second wavelength, without a fluorescing agent, florescent material, or other fluorescing additive added to the contaminants.

10. The system of claim 9, wherein the light subsystem comprises control circuitry allowing dimming of the light sources.

11. The system of claim 9, further comprising a clamping module that allows the light subsystem, shutter module, and passive cooling subsystem to collectively attach as a unit in a removable manner to the viewing device.

12. The system of claim 9, wherein the selective filter wavelength is greater than the first wavelength and less than the fluorescent feedback second wavelength; and wherein the first wavelength is in a range from 400 nm to 500 nm.

13. The system of claim 9, wherein the first wavelength of the blue light source is in a range from 450 nm to 475 nm; and wherein the fluorescent feedback second wavelength is greater than 500 nm.

14. The system of claim 9, wherein the passive cooling subsystem comprises a plurality of heat sinks or vents.

15. The system of claim 9, further comprising at least one of a white light source and an ultraviolet light source for the viewing device.

16. The system of claim 9, further comprising a switch operatively connected to the light subsystem and shutter module, thereby controlling operation of the light subsystem.

17. The system of claim 9, further comprising a light source holding apparatus, wherein the light source holding apparatus comprises a U-shaped main body configured to couple to the viewing device, at least one holding member for the blue light source pivotably connected to the light source holding apparatus, and a shield coupled to the light source holding apparatus by a bracket.

18. The system of claim 9, further comprising at least one non-transitory computer readable storage medium having instructions encoded thereon that, when executed by one or more processors, result in operations configured to:
  emit light from the blue light source at the first wavelength toward the electronic circuit board;
  process one or more images of the electronic circuit board and the contaminants;
  determine whether the contaminants are in an acceptable region and within an acceptable level; and
  provide an indication when the contaminants are not in the acceptable region or within the acceptable level.

19. A system for detecting fluorescing particles on a target, comprising:
  a microscope and an imaging camera;
  a light subsystem coupled to the microscope comprising a plurality of blue light LEDs, a plurality of white light LEDs and a plurality of ultraviolet light LEDs integrated into a single unitary housing, wherein at least one of the blue light source and the ultraviolet light emits light energy at a first wavelength towards the target; and
  at least one filter removably attached to the microscope having a selected filter wavelength that allows light to pass that is greater than the first wavelength; wherein the fluorescing particles include an organic component that effectuates the fluorescent feedback second wavelength, and wherein the fluorescing particles that include the organic component are part of the target and are not a fluorescing agent, fluorescent material, or other fluorescing additive that is added to or mixed with the target.

* * * * *